(12) United States Patent
Gu et al.

(10) Patent No.: US 11,378,799 B1
(45) Date of Patent: Jul. 5, 2022

(54) DISPLAY DEVICE AND IMAGING SYSTEM

(71) Applicant: Shanghai Tianma Micro-Electronics Co., Ltd., Shanghai (CN)

(72) Inventors: Yuefeng Gu, Shanghai (CN); Jiandong Wang, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 0 days.

(21) Appl. No.: 17/364,629

(22) Filed: Jun. 30, 2021

(30) Foreign Application Priority Data

Apr. 13, 2021 (CN) .......................... 202110391592.4

(51) Int. Cl.
*G02B 27/01* (2006.01)
*B60K 35/00* (2006.01)

(52) U.S. Cl.
CPC .......... *G02B 27/0101* (2013.01); *B60K 35/00* (2013.01); *B60K 2370/1529* (2019.05); *G02B 2027/0138* (2013.01)

(58) Field of Classification Search
CPC ........ G02B 27/0101; G02B 2027/0138; B60K 35/00; B60K 2370/1529
See application file for complete search history.

(56) References Cited

U.S. PATENT DOCUMENTS

| | | | |
|---|---|---|---|
| 2017/0097504 A1* | 4/2017 | Takamatsu | G02B 27/0101 |
| 2017/0171531 A1* | 6/2017 | Xie | G02B 27/0101 |
| 2017/0176744 A1* | 6/2017 | El-Ghoroury | G02B 27/1066 |
| 2017/0199379 A1* | 7/2017 | Lee | G02B 27/01 |
| 2017/0293140 A1* | 10/2017 | Cai | B60K 35/00 |
| 2017/0336628 A1* | 11/2017 | Kim | G02B 27/0101 |
| 2018/0157036 A1* | 6/2018 | Choi | G06T 19/006 |
| 2018/0201134 A1* | 7/2018 | Choi | G06T 17/05 |
| 2018/0217429 A1* | 8/2018 | Busch | G02F 1/1395 |
| 2019/0033583 A1* | 1/2019 | Chauveau | G02B 27/144 |
| 2019/0049723 A1* | 2/2019 | Qin | G01G 23/3728 |
| 2019/0146216 A1* | 5/2019 | Mourou | B60J 1/02 |
| | | | 280/781 |

(Continued)

FOREIGN PATENT DOCUMENTS

| CN | 107554425 A | 1/2018 |
|---|---|---|
| CN | 108490616 A | 9/2018 |

(Continued)

*Primary Examiner* — Ibrahim A Khan
(74) *Attorney, Agent, or Firm* — Anova Law Group, PLLC

(57) ABSTRACT

A display device and an imaging system are provided. The display device includes a double-sided display module, a reflective component, and a curved mirror. The double-sided display module includes first and second light-exiting surfaces. In a first direction, light emitted from the first light-exiting surface is projected to a first position on the curved mirror. The reflective component at least reflects light emitted from the second light-exiting surface to a second position on the curved mirror. In a second direction, the curved mirror reflects the light emitted from the first light-exiting surface and the light emitted from the second light-exiting surface and reflected by the reflective component, to form a first virtual image and a second virtual image. Along the first direction, the first virtual image is spaced apart from the second virtual image, and the first direction intersects the second direction.

20 Claims, 22 Drawing Sheets

(56) References Cited

U.S. PATENT DOCUMENTS

| | | | |
|---|---|---|---|
| 2020/0124846 A1* | 4/2020 | Higashiyama | G02B 27/0101 |
| 2022/0016978 A1* | 1/2022 | Helot | G07C 1/30 |
| 2022/0055479 A1* | 2/2022 | Qin | B60K 35/00 |

FOREIGN PATENT DOCUMENTS

| | | |
|---|---|---|
| CN | 208921975 U | 5/2019 |
| CN | 209707813 U | 11/2019 |

\* cited by examiner

DISPLAY DEVICE AND IMAGING SYSTEM

CROSS-REFERENCE TO RELATED APPLICATION

This application claims the priority of Chinese patent application No. 202110391592.4, filed on Apr. 13, 2021, the entirety of which is incorporated herein by reference.

FIELD

The present disclosure generally relates to the field of display technology and, more particularly, relates to a display device and an imaging system.

BACKGROUND

With the development of optical technology, display devices each including a liquid crystal panel and light-emitting diodes have been fully applied in various fields. Such display devices have been fully used in vehicles such as automobiles and locomotives, to provide a desired driving assistance.

To improve comfort and safety in modern vehicles, more and more vehicles are equipped with a head-up display (HUD). The head-up display often uses a reflective imaging system to image the driving information displayed on a small display screen into a virtual image levitated above the hood. Because the driver can observe important driving information without lowering head and refocusing of eyes, the driver's line of sight can always be kept on the road, which improves the driving safety. Therefore, the HUD has been widely used in vehicles, and has brought desired visual experience for observers such as driver and passenger.

With the development of display technology, the head-up display that realizes double-group display has gradually appeared. The double-group display refers to that the virtual images levitated above the hood includes two virtual images with different projection distances that include a state projection (near projection) displaying driving information and an augmented reality projection (far projection) displaying driving assistance information. The augmented reality head-up display (AR-HUD) accurately combines the image information with the actual traffic conditions through the internal specially designed optical system, thereby enhancing the driver's perception of the actual driving environment.

Compared with the conventional HUD with a single function, the AR-HUD realizes the state projection (near projection) and the augmented reality projection (far projection) with different projection distances, and the field of view is substantially large and can be substantially realistically integrated with the surrounding environment, thereby improving user experience. However, in the prior art, to achieve two projections with different distances of the augmented reality head-up display, two sets of HUD devices are needed to generate two sets of HUD imaging optical paths, which occupy a substantially large space in the vehicle and increase system cost and complexity.

Therefore, how to provide a display device and an imaging system that is capable of displaying two virtual images with far and near distances and having a substantially small size and low cost is an urgent technical problem that needs to be solved.

SUMMARY

One aspect of the present disclosure provides a display device. The display device includes a double-sided display module, a reflective component, and a curved mirror. The double-sided display module includes a first light-exiting surface and a second light-exiting surface. In a first direction, the curved mirror is disposed on a side of the first light-exiting surface, and light emitted from the first light-exiting surface is projected to a first position on the curved mirror. The reflective component at least reflects light emitted from the second light-exiting surface to a second position on the curved mirror. The first position does not overlap the second position. In a second direction, the curved mirror reflects the light emitted from the first light-exiting surface and the light emitted from the second light-exiting surface and reflected by the reflective component, to form a first virtual image and a second virtual image. Along the first direction, the first virtual image is spaced apart from the second virtual image, and the first direction intersects the second direction.

Another aspect of the present disclosure provides an imaging system. The imaging system includes an imaging glass and a display device. The display device includes a double-sided display module, a reflective component, and a curved mirror. The double-sided display module includes a first light-exiting surface and a second light-exiting surface. In a first direction, the curved mirror is disposed on a side of the first light-exiting surface, and light emitted from the first light-exiting surface is projected to a first position on the curved mirror. The reflective component at least reflects light emitted from the second light-exiting surface to a second position on the curved mirror. The first position does not overlap the second position. In a second direction, the curved mirror reflects the light emitted from the first light-exiting surface and the light emitted from the second light-exiting surface and reflected by the reflective component, to form a first virtual image and a second virtual image. Along the first direction, the first virtual image is spaced apart from the second virtual image, and the first direction intersects the second direction. The imaging glass is configured to reflect the first virtual image and the second virtual image.

Other aspects of the present disclosure can be understood by those skilled in the art in light of the description, the claims, and the drawings of the present disclosure.

BRIEF DESCRIPTION OF THE DRAWINGS

To more clearly illustrate the embodiments of the present disclosure, the drawings will be briefly described below. The drawings in the following description are certain embodiments of the present disclosure, and other drawings may be obtained by a person of ordinary skill in the art in view of the drawings provided without creative efforts.

DETAILED DESCRIPTION OF THE DISCLOSURE

Reference will now be made in detail to exemplary embodiments of the disclosure, which are illustrated in the accompanying drawings. Wherever possible, the same reference numbers will be used throughout the drawings to refer to the same or the alike parts. The described embodiments are some but not all of the embodiments of the present disclosure. Based on the disclosed embodiments, persons of ordinary skill in the art may derive other embodiments consistent with the present disclosure, all of which are within the scope of the present disclosure.

Similar reference numbers and letters represent similar terms in the following Figures, such that once an item is defined in one Figure, it does not need to be further discussed in subsequent Figures.

Figure 1:
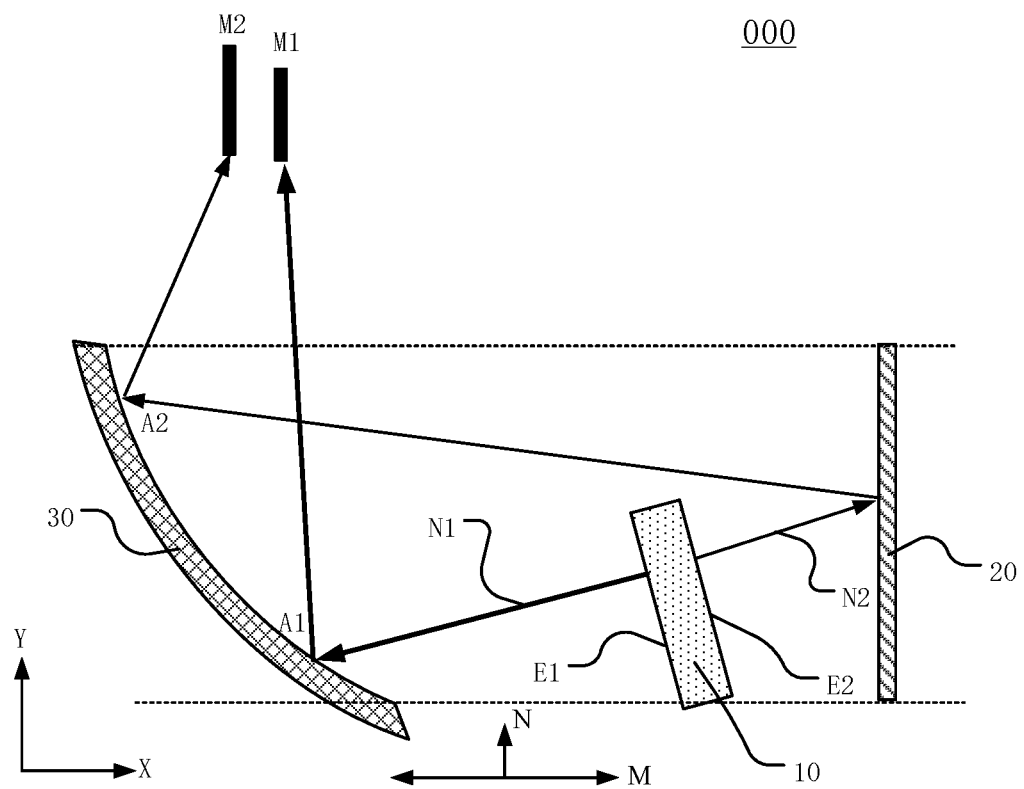
FIG. 1 illustrates a schematic diagram of an exemplary display device consistent with disclosed embodiments of the present disclosure.

The present disclosure provides a display device. FIG. 1 illustrates a schematic diagram of a display device consistent with disclosed embodiments of the present disclosure.

Referring to FIG. 1, a display device 000 may include a double-sided display module 10, a reflective component 20, and a curved mirror 30. The double-sided display module 10 may include a first light-exiting surface E1 and a second light-exiting surface E2.

In a first direction M (an arrangement direction of the curved mirror 30 and the double-sided display module 10, and the first direction M may be parallel to a horizontal direction or may have a certain angle with respect to the horizontal direction), the curved mirror 30 may be disposed on a side of the first light-exiting surface E1, and the light emitted from the first light-exiting surface E1 may be projected to a first position A1 on the curved mirror 30.

The reflective component 20 may at least reflect the light emitted from the second light-exiting surface E2 to a second position A2 on the curved mirror 30. The first position A1 and the second position A2 may not overlap each other. It should be understood that for illustrative purposes, the first light-exiting surface E1 and the second light-exiting surface E2 in the Figure may merely use a beam of light as an example, which may not represent all the light emitted from the light-exiting surfaces.

In a second direction N (the second direction N may be parallel to a vertical direction or may have a certain angle with respect to the vertical direction), the curved mirror 30 may reflect the light emitted from the double-sided display module 10 and/or the light reflected by the reflective component 20 to form a first virtual image M1 and a second virtual image M2. Along the first direction M, the first virtual image M1 may be spaced apart from the second virtual image M2. The first direction M may intersect the second direction N. Optionally, in a same plane, the first direction M and the second direction N may be perpendicular to each other.

Specifically, the display device 000 in the present disclosure may include the double-sided display module 10. The double-sided display module 10 may include the first light-exiting surface E1 and the second light-exiting surface E2. Optionally, the first light-exiting surface E1 and the second light-exiting surface E2 may be two different light-exiting surfaces of the double-sided display module 10 that are arranged opposite to each other (as shown in FIG. 1). The double-sided display module 10 may include a double-sided display panel for displaying images on the first light-exiting surface E1 and the second light-exiting surface E2, respectively. Optionally, the image displayed on the first light-exiting surface E1 of the double-sided display module 10 may be the same as or different from the image displayed on the second light-exiting surface E2 of the double-sided display module 10. In other words, the display screen of the first light-exiting surface E1 of the double-sided display module 10 and the display screen of the second light-exiting surface E2 of the double-sided display module 10 may be driven by a same driving unit to display a same image, or may be driven by different driving units to display different image, which may not be limited by the present disclosure.

In one embodiment, after the first light-exiting surface E1 and the second light-exiting surface E2 of the double-sided display module 10 display images, because in the first direction M, the curved mirror 30 is disposed on a side of the first light-exiting surface E1, at least the light N1 emitted from the first light-exiting surface E1 may be directly projected to the first position A1 on the curved mirror 30 along the first direction M, and then may be reflected by the curved mirror 30 to form the first virtual image M1. Because the second light-exiting surface E2 and the first light-exiting surface E1 are arranged opposite to each other, at least the light N2 emitted from the second light-exiting surface E2 may be projected to the second position A2 on the curved mirror 30 after being reflected by the reflective component 20, and then may be reflected by the curved mirror 30 to form the second virtual image M2. It should be understood that the lines of different widths may be configured to distinguish the paths of the light N1 emitted from the first light-exiting surface E1 and the light N2 emitted from the second light-exiting surface E2, and the line may merely illustrate one of paths of the light emitted from the light-exiting surface. Optionally, the reflective component 20 may include a plane mirror having a reflection function.

The first position A1 may not overlap the second position A2. In other words, the position where the light emitted from the first light-exiting surface E1 is directly projected to the curved mirror 30 may be different from the position where the light emitted from the second light-exiting surface E2 is projected to the curved mirror 30 after being reflected by the reflective component 20. Therefore, two virtual images with different distances may be formed. In other words, the first virtual image M1 may be spaced apart from the second virtual image M2 in the first direction M.

The display device 000 in the present disclosure may form two virtual images with different distances through the cooperation of optical paths of the reflective component 20, the curved mirror 30 and the double-sided display module 10. The double-sided display module 10 may directly provide an integrated double-image source without needing two sets of HUD devices to generate two sets of imaging optical paths and even without needing two projection devices in a set of HUD device, which may facilitate to reduce a volume of the entire display device and reduce the cost. Further, the first position A1 and the second position A2 on the curved mirror 30 may not overlap each other, which may avoid superimposed interference as much as possible and may facilitate to improve the imaging quality.

Figure 2:
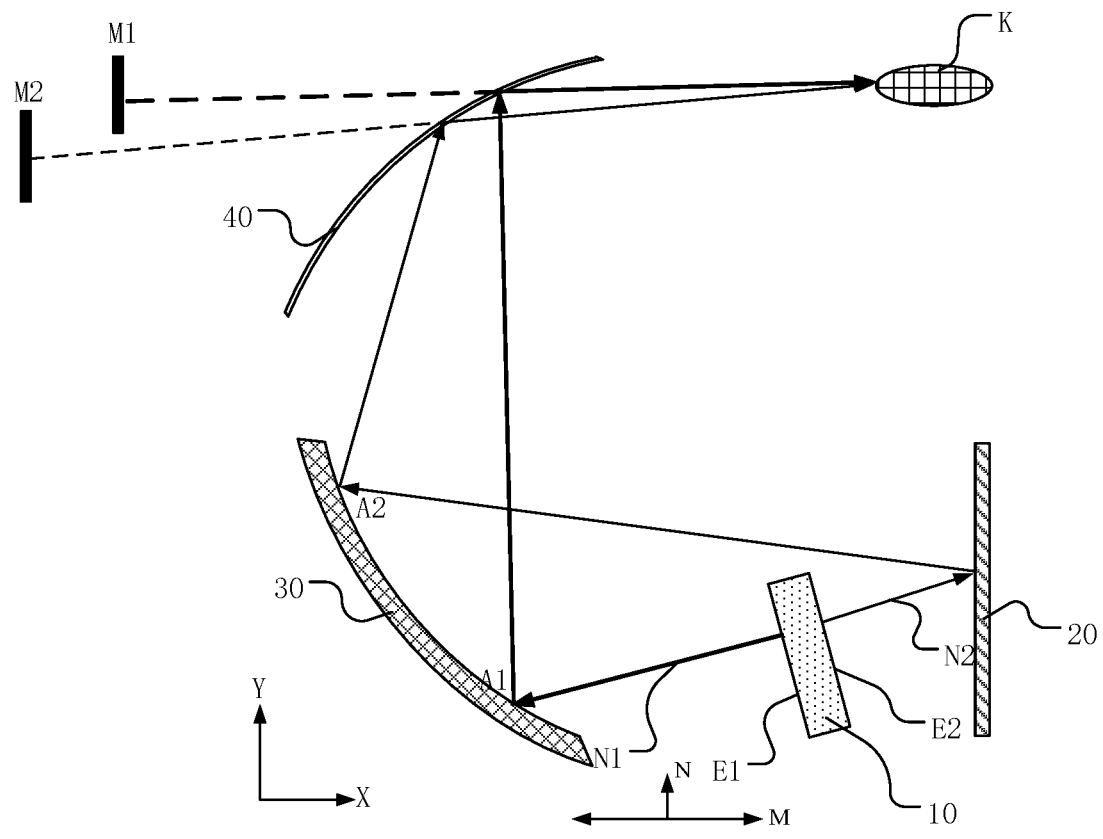
FIG. 2 illustrates a schematic diagram of using an exemplary display device consistent with disclosed embodiments of the present disclosure.

FIG. 2 illustrates a schematic diagram of using the display device consistent with disclosed embodiments of the present disclosure. It should be understood that referring to FIG. 2, the display device 000 may be applied to the field of vehicle display. For example, the display device 000 may be configured to achieve the augmented reality head-up display technology in vehicle display. In other words, through the cooperation of optical paths of the integrated double-image source directly provided by the double-sided display module 10, the reflective component 20 and the curved mirror 30, the first virtual image M1 and the second virtual image M2 with different distances may be formed above the hood in front of a car front windshield 40. The content of the virtual image close to the front windshield may include substantially important information such as the state of driving information. The content of the virtual image far from the front windshield may include driving assistance information, etc.

It should be understood that for illustrative purposes, the first virtual image M1 in FIG. 2 may be close to the front windshield 40 as an example. When the light forming the first virtual image M1 is projected to the curved mirror 30, a total object distance u1 may be a distance from the first light-exiting surface E1 to the curved mirror 30. When the light forming the second virtual image M2 is projected to the curved mirror 30, a total object distance u2 may be a sum of a distance from the second light-exiting surface E2 to the reflective component 20 and a distance from the reflective component 20 to the curved mirror 30, where u2>u1. For the same curved mirror 30, when the object distance is less than a focal length, the larger the object distance, the larger the imaging distance. A focal length of the curved mirror with a curved radius of R may be approximately R/2, and in the present disclosure, the object distance may be less than the focal length. Therefore, the second virtual image M2 may be farther from the front windshield 40, and the first virtual image M1 may be closer to the front windshield 40.

Optionally, when the display device 000 is applied to a vehicle display, along the second direction N, the front windshield 40 may be disposed on a side of the curved mirror 30. The light reflected by the curved mirror 30 may be reflected by the front windshield 40 to enter an observation point K (such as the eyes of the observer in the cab). The ultimate observation from the observation point K may include the first virtual image M1 and the second virtual image M2 formed by the backward extension of the light reflected by the front windshield 40. Therefore, the field of view of the observer in the car may be substantially large, and may be substantially realistically integrated with the surrounding environment, which may improve user experience and safety, may reduce the volume occupied by the vehicle display structure in the car and may reduce production cost without affecting the display effect.

It should be noted that the curvature of the curved mirror 30, and the placement angles of the reflective component 20 and the double-sided display module 10 may not be limited by the present disclosure. The reflective component 20 may be a plane mirror or a non-plane mirror. The curved mirror 30 may be a free-form mirror such as a concave mirror, a convex mirror, etc., or an aspherical mirror. As long as the curved mirror has a reflective surface as a curved surface and is capable of cooperating with the optical paths of the reflective component 20 and the double-sided display module 10 to form two virtual images with different distance, which may not be limited by the present disclosure, and may be determined according to practical applications.

Optionally, a lower edge of the double-sided display module 10 may be coplanar with a lower edge of the curved mirror 30 (as shown by the dashed line in FIG. 1), or the lower edge of the double-sided display module 10 may be higher than the lower edge of the curved mirror 30, such that the light emitted from the first light-exiting surface E1 of the double-sided display module 10 may be projected to the curved mirror 30 as much as possible. The lower edge of the double-sided display module 10 may be coplanar with a lower edge of the reflective component 20 (as shown by the dashed line in FIG. 1), or the lower edge of the double-sided display module 10 may be higher than a lower edge of the reflective component 20, such that the light emitted from the second light-exiting surface E2 of the double-sided display module 10 may be projected to the reflective surface of the reflective component 20 as much as possible for reflection. An upper edge of the curved mirror 30 may be coplanar with an upper edge of the reflective component 20 (as shown by the dotted line in FIG. 1), or the upper edge of the reflective component 20 may be lower than the upper edge of the curved mirror 30, such that after being reflected by the reflective component 20, the light emitted from the second light-exiting surface E2 of the double-sided display module 10 may be projected to the curved mirror 30 as much as possible, which may avoid light loss and improve light utilization.

Optionally, the curved mirror 30 may be a concave mirror. Along the first direction M, the curved mirror 30 may be recessed in a direction away from the double-sided display module 10 to form a concave mirror, such that the light projected from the double-sided display module 10 and the reflective component 20 may be reflected by a concave surface recessed in a direction away from the double-sided display module 10.

FIG. 1 and FIG. 2 may merely illustrate the double-sided display module 10 in a block diagram, which may not illustrate the specific structure of the double-sided display module 10. The structure of the double-sided display module 10 may include the double-sided display panel, and may also include a backlight component, etc. As long as the double-sided display module 10 is capable of achieving a double-sided display effect and providing an integrated double-image source, which may not be limited by the present disclosure.

Figure 3:
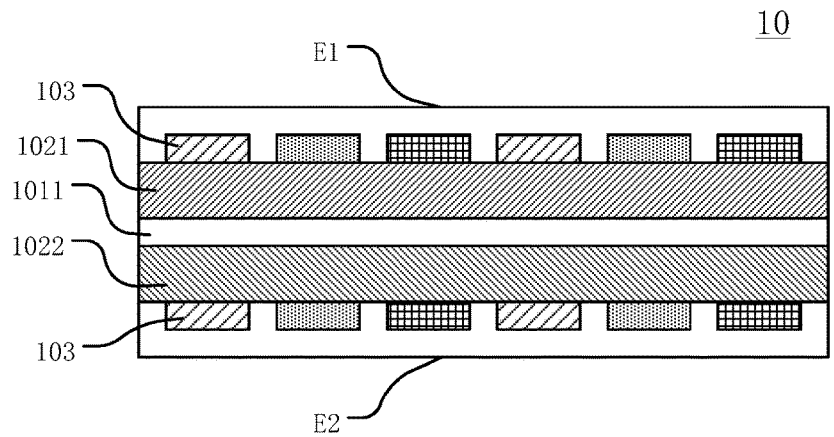
FIG. 3 illustrates a schematic local cross-sectional view of an exemplary double-sided display module consistent with disclosed embodiments of the present disclosure.
Figure 4:
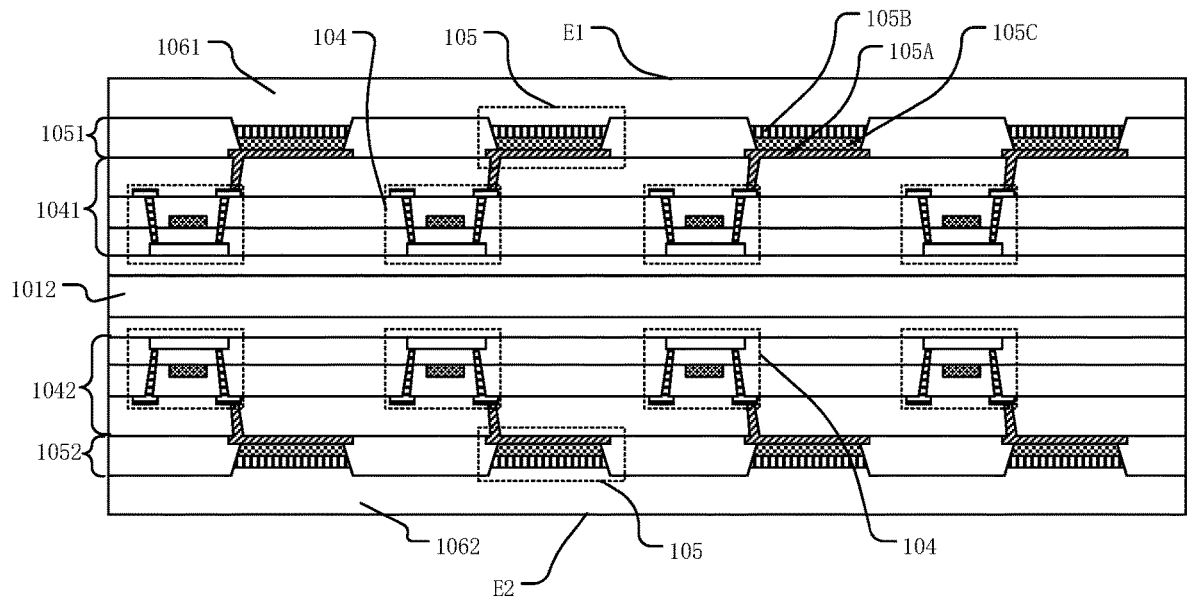
FIG. 4 illustrates a schematic local cross-sectional view of another exemplary double-sided display module consistent with disclosed embodiments of the present disclosure.

FIG. 3 illustrates a schematic local cross-sectional view of a double-sided display module consistent with disclosed embodiments of the present disclosure; and FIG. 4 illustrates a schematic local cross-sectional view of another double-sided display module consistent with disclosed embodiments of the present disclosure. In certain embodiments, referring to FIG. 3 and FIG. 4, the double-sided display module 10 may include any one of a micro light-emitting diode double-sided display screen, a mini light-emitting diode double-sided display screen, an organic light-emitting diode double-sided display screen, and a quantum dot light-emitting diode double-sided display screen.

In the present disclosure, the double-sided display module 10 may include a self-luminous double-sided display screen without backlight, such as a micro light-emitting diode (Micro LED) double-sided display screen, a mini light-emitting diode (Mini LED) double-sided display screen, an organic light-emitting diode (OLED) double-sided display screen, and a quantum dot light-emitting diode (QLED) double-sided display screen. Quantum dot may be an inorganic semiconductor nanocrystal, and may often be composed of zinc, cadmium, selenium and sulfur atoms. The structure of quantum dot may be divided into three layers of core, shell and ligand from the inside to the outside. When being stimulated by light or electricity, quantum dot may emit light, and the color of light may be determined by the composition material, size and shape of the quantum dot. In an ideal state, by controlling the continuous change of the diameter of the quantum dot, a continuous spectrum effect close to natural light may be obtained.

Referring to FIG. 3, the Micro LED double-sided display screen and the Mini LED double-sided display screen may include a substrate base 1011, and a first driving base 1021 and a second driving base 1022 disposed on opposite sides of the substrate base 1011. The substrate base 1011 may be configured as a carrier for each film layer structure of the double-sided display screen, and the first driving base 1021 and the second driving base 1022 may be configured to form driving circuits for driving light-emitting. A plurality of micro light-emitting diodes/mini light-emitting diodes 103 arranged in an array may be disposed on a side of the first driving base 1021 away from the substrate base 1011, and the plurality of micro light-emitting diodes/mini light-emitting diodes 103 on such side may be electrically connected to the driving circuits (not shown in the Figure) in the first driving base 1021, respectively. Similarly, a plurality of micro light-emitting diodes/mini light-emitting diodes 103 arranged in an array may be disposed on a side of the second driving base 1022 away from the substrate base 1011, and the plurality of micro light-emitting diodes/mini light-emitting diodes 103 on such side may be electrically connected to the driving circuits (not shown in the Figure) in the second driving base 1022, respectively.

The micro light-emitting diodes/mini light-emitting diodes 103 may achieve self-luminous through the driving circuits in the first driving base 1021 and the second driving base 1022. The driving modes of the first driving base 1021 and the second driving base 1022 may be different, such that different images may be displayed on the first light-exiting surface E1 and the second light-exiting surface E2, respectively. Optionally, the driving modes of the first driving base 1021 and the second driving base 1022 may be the same, such that a same image may be displayed on the first light-exiting surface E1 and the second light-exiting surface E2, respectively. Optionally, the first driving base 1021 and the second driving base 1022 may be multiplexed when displaying the same image, which may facilitate to thin the double-sided display module 10 and to reduce the volume.

Optionally, the micro light-emitting diodes/mini light-emitting diodes 103 disposed on the first driving base 1021 may have an arrangement density and arrangement manner same as or different from the micro light-emitting diodes/mini light-emitting diodes 103 disposed on the second driving base 1022, which may be selectively set according to whether the to-be-displayed images are the same. Optionally, the plurality of microlight-emitting diodes/mini light-emitting diodes 103 arranged in an array may include micro light-emitting diodes/mini light-emitting diodes 103 of different colors, to display a color image.

Referring to FIG. 4, an organic light-emitting diode (OLED) double-sided display screen may include a substrate base 1012. A first thin film transistor array layer 1041, a first light-emitting layer 1051, and a first encapsulation layer 1061 may be sequentially disposed over one side of the substrate base 1012, and a second thin film transistor array layer 1042, a second light-emitting layer 1052, and a second encapsulation layer 1062 may be sequentially disposed over the other side of the substrate base 1012. The first light-emitting layer 1051 and the second light-emitting layer 1052 each may include a plurality of light-emitting devices 105. The light-emitting device 105 may be a light-emitting diode, and may include a first electrode 105A, a second electrode 105B, and an organic light-emitting layer 105C disposed between the first electrode 105A and the second electrode 105B. Optionally, the first electrode 105A may be an anode electrode, and the second electrode 105B may be a cathode electrode.

The first thin film transistor array layer 1041 and the second thin film transistor array layer 1042 each may include a plurality of thin film transistors 104. The drain of the thin film transistor 104 in the first thin film transistor array layer 1041 may be electrically connected to the first light-emitting layer 1051, and the drain of the thin film transistor 104 in the second thin film transistor array layer 1042 may be electrically connected to the second light-emitting layer 1052. The first encapsulation layer 1061 and the second encapsulation layer 1062 each may at least include a thin-film encapsulation structure (not shown in the Figure) composed of an inorganic layer, an organic layer, and an inorganic layer that are laminated. Therefore, the first thin-film transistor array layer 1041 may drive the light-emitting device 105 in the first light-emitting layer 1051 to emit light autonomously, and the second thin film transistor array layer 1042 may drive the light-emitting device 105 in the second light-emitting layer 1052 to emit light autonomously, to achieve the double-sided display effect of the first light-exiting surface E1 and the second light-exiting surface E2.

Figure 5:
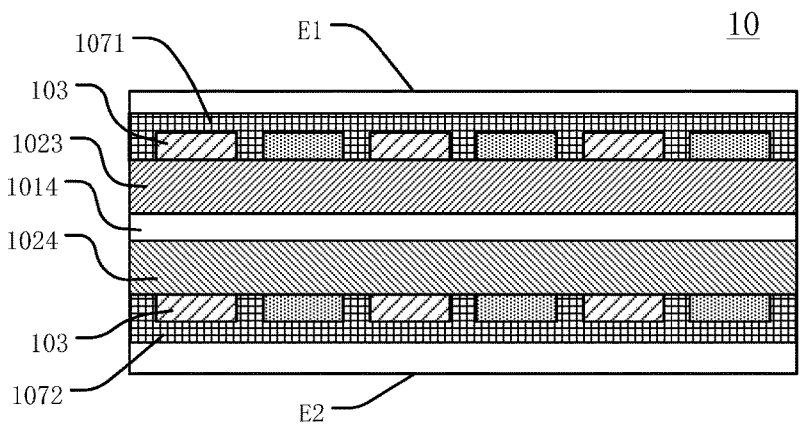
FIG. 5 illustrates a schematic local cross-sectional view of another exemplary double-sided display module consistent with disclosed embodiments of the present disclosure.

Referring to FIG. 5, the quantum dot light-emitting diode (QLED) double-sided display screen may include a substrate base 1014, and a third driving base 1023 and a fourth driving base 1024 disposed on opposite sides of the substrate base 1014. The substrate base 1014 may be configured as a carrier for each film layer structure of the double-sided display screen. The third driving base 1023 and the fourth driving base 1024 may be configured to form driving circuits for driving light-emitting. A plurality of micro light-emitting diodes/mini light-emitting diodes 103 arranged in an array may be disposed on a side of the third driving base 1023 away from the substrate base 1014, and the plurality of micro light-emitting diodes/mini light-emitting diodes 103 on such side may be electrically connected to the driving circuits (not shown in the Figure) in the third driving base 1023, respectively. A first quantum dot film 1071 may cover a side of the plurality of micro light-emitting diodes/mini light-emitting diodes 103 away from the third driving base 1023.

Similarly, a plurality of micro light-emitting diodes/mini light-emitting diodes 103 arranged in an array may be disposed on a side of the fourth driving base 1024 away from the substrate base 1014, and the plurality of micro light-emitting diodes/mini light-emitting diodes 103 on such side may be electrically connected to the driving circuits (not shown in the Figure) in the fourth driving base 1024, respectively. A second quantum dot film 1072 may cover a side of the plurality of micro light-emitting diodes/mini light-emitting diodes 103 away from the fourth driving base 1024.

The micro light-emitting diodes/mini light-emitting diodes 103 on both sides of the substrate base 1014 may achieve self-luminous through the driving circuits in the third driving base 1023 and the fourth driving base 1024. The driving modes of the third driving base 1023 and the fourth driving base 1024 may be different, such that different images may be displayed on the first light-exiting surface E1 and the second light-exiting surface E2, respectively. Optionally, the driving modes of the third driving base 1023 and the fourth driving base 1024 may be the same, such that a same image may be displayed on the first light-exiting surface E1 and the second light-exiting surface E2, respectively. Optionally, the third driving base 1023 and the fourth driving base 1024 may be multiplexed when displaying the same image, which may facilitate to thin the double-sided display module 10 and to reduce the volume.

Optionally, the micro light-emitting diodes/mini light-emitting diodes 103 disposed on the third driving base 1023 may have an arrangement density and arrangement manner same as or different from the micro light-emitting diodes/mini light-emitting diodes 103 disposed on the fourth driving base 1024, which may be selectively set according to whether the to-be-displayed images are the same. Optionally, the plurality of micro light-emitting diodes/mini light-emitting diodes 103 arranged in an array may include micro light-emitting diodes/mini light-emitting diodes 103 of different colors, to display a color image.

Optionally, in the quantum dot light-emitting diode double-sided display screen, the first quantum dot film 1071 and the second quantum dot film 1072 may emit fluorescence after being excited under an electro-induced condition, and the light emission of the quantum dot may have desired fluorescence intensity and stability. The emission spectrum of the quantum dot may be controlled by changing the size of the quantum dot. By changing the size and chemical composition of the quantum dot, the emission spectrum of the quantum dot may cover the entire visible light region. Therefore, the micro light-emitting diodes/mini light-emitting diodes 103 arranged in an array may merely include light-emitting diodes of short-wavelength, such as micro light-emitting diodes/mini light-emitting diodes that emit a blue-violet color.

The double-sided display module 10 in the present disclosure may have a self-luminous light-emitting double-sided screen structure without backlight, which may facilitate to reduce the thickness of the double-sided display module 10 and to reduce the volume occupied by the entire display device 000.

It should be noted that the specific structure of the micro light-emitting diode double-sided display screen, the mini light-emitting diode double-sided display screen, the organic light-emitting diode double-sided display screen, and the quantum dot light-emitting diode double-sided display screen may not be described in detail in the present disclosure, which may refer to the structure of the micro light-emitting diode display panel, the mini light-emitting diode display panel, the organic light-emitting diode display panel, and the quantum dot light-emitting diode display panel in the related art for understanding.

Figure 6:
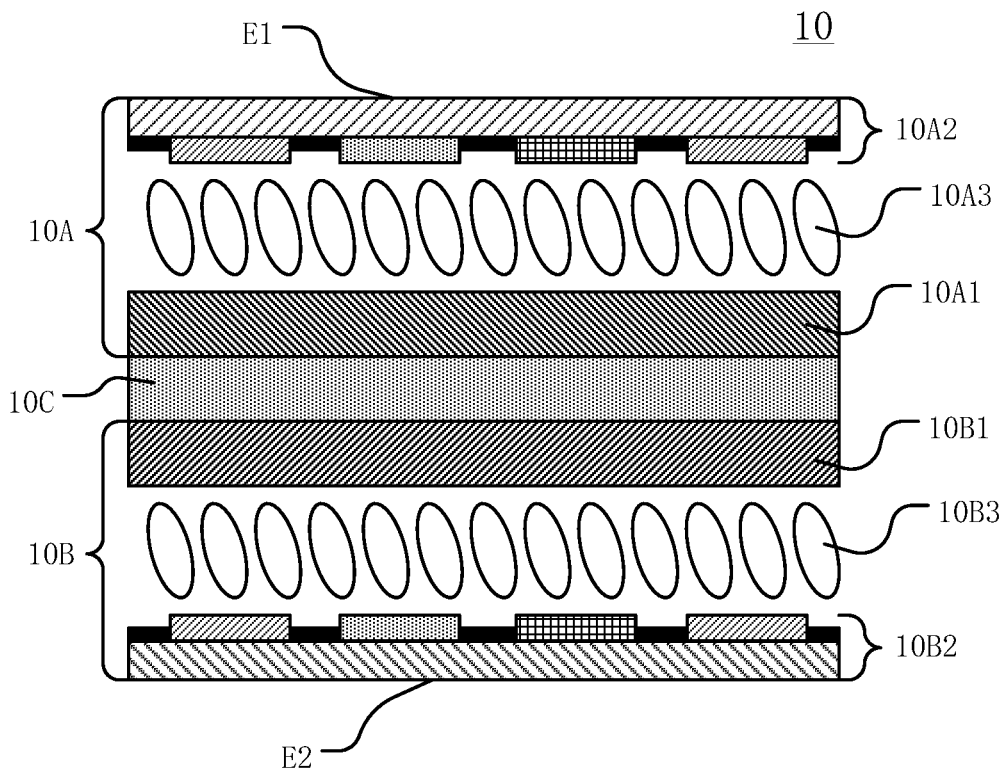
FIG. 6 illustrates a schematic local cross-sectional view of another exemplary double-sided display module consistent with disclosed embodiments of the present disclosure.

FIG. 6 illustrates a schematic local cross-sectional view of another double-sided display module consistent with disclosed embodiments of the present disclosure. In certain embodiments, referring to FIG. 6, the double-sided display module 10 may include a first liquid crystal display panel 10A, a first backlight module 10C, and a second liquid crystal display panel 10B that are laminated to fit each other. The first backlight module 10C may be any one of a direct back-lit module and an edge back-lit module. The first liquid crystal display panel 10A may include the first light-exiting surface E1, and the second liquid crystal display panel 10B may include the second light-exiting surface E2.

The present disclosure may explain that the double-sided display module 10 may be a liquid crystal double-sided display screen with a backlight module. In other words, the double-sided display module 10 may include the first liquid crystal display panel 10A, the first backlight module 10C and the second liquid crystal display panel 10B that are laminated to fit each other. The first backlight module 10C may be any one of a direct back-lit module and an edge back-lit module.

Optionally, the first liquid crystal display panel 10A may include a first array substrate 10A1 and a first color filter substrate 10A2 that are oppositely arranged, and a first liquid crystal layer 10A3 disposed between the first array substrate 10A1 and the first color filter substrate 10A2. The second liquid crystal display panel 10B may include a second array substrate 10B1 and a second color filter substrate 10B2 that are oppositely arranged, and a second liquid crystal layer 10B3 disposed between the second array substrate 10B1 and the second color filter substrate 10B2. The first liquid crystal display panel 10A may include the first light-exiting surface E1, and the second liquid crystal display panel 10B may include the second light-exiting surface E2. In the disclosed double-sided display module 10, the first liquid crystal display panel 10A and the second liquid crystal display panel 10B may share the first backlight module 10C, which may facilitate to reduce the overall thickness of the double-sided display module 10.

It should be noted that the specific structures of the first liquid crystal display panel 10A, the first backlight module 10C, and the second liquid crystal display panel 10B may not be described in detail in the present disclosure. For example, the color filter substrate may include a black matrix layer and a color resist layer. The array substrate may include a driving transistor array layer, an electrode layer, etc. The first backlight module 10C may include optical films such as a reflective sheet, a brightness enhancement film and a diffuser, etc., and a backlight source, etc. The backlight source in the first backlight module 10C may be a light-emitting diode, which may be understood with reference to the structures of a liquid crystal display panel and a backlight module that provides a backlight source for the liquid crystal display panel in the related art.

Figure 7:
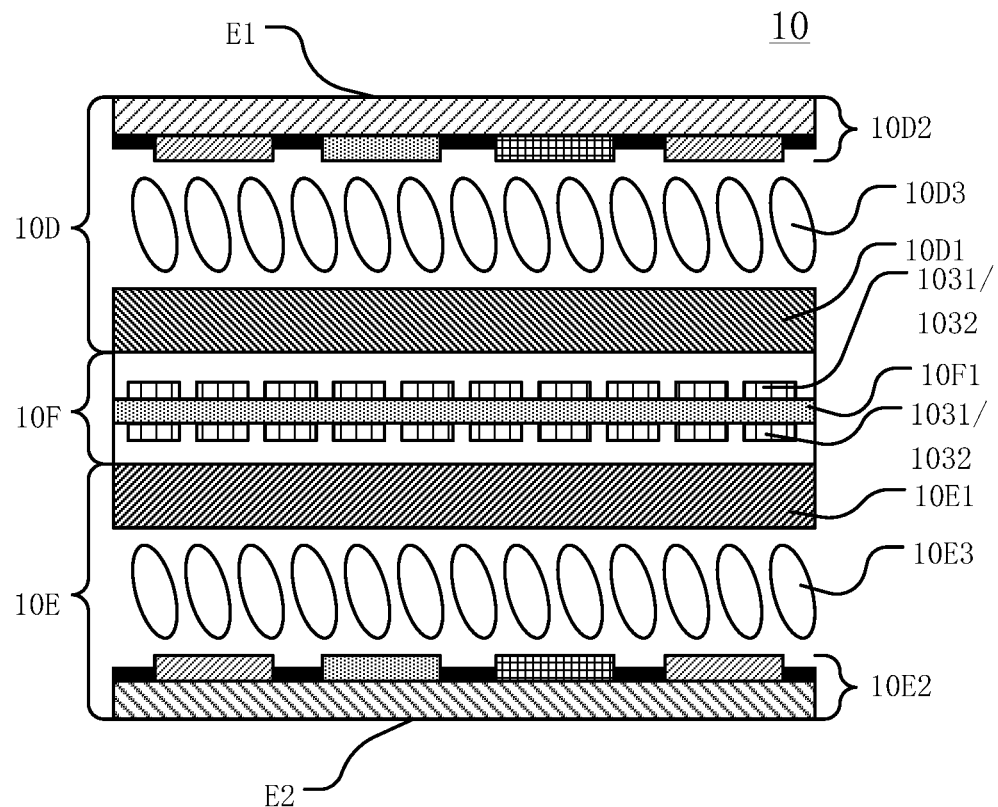
FIG. 7 illustrates a schematic local cross-sectional view of another exemplary double-sided display module consistent with disclosed embodiments of the present disclosure.

FIG. 7 illustrates a schematic local cross-sectional view of another double-sided display module consistent with disclosed embodiments of the present disclosure. In certain embodiments, referring to FIG. 7, the double-sided display module 10 may include a third liquid crystal display panel 10D, a second backlight module 10F, and a fourth liquid crystal display panel 10E that are laminated to fit each other. The second backlight module 10F may include a plurality of mini light-emitting diodes 1031 arranged in an array, or a plurality of micro light-emitting diodes 1032 arranged in an array. The third liquid crystal display panel 10D may include the first light-exiting surface E1, and the fourth liquid crystal display panel 10E may include the second light-exiting surface E2.

The present disclosure may explain that the double-sided display module 10 may be a liquid crystal double-sided display screen with a backlight module. In other words, the double-sided display module 10 may include the third liquid crystal display panel 10D, the second backlight module 10F, and the fourth liquid crystal display panel 10E that are laminated to fit each other. The second backlight module 10F may be a direct back-lit module, and may include a plurality of mini light-emitting diodes 1031 arranged in an array, or a plurality of micro light-emitting diodes 1032 arranged in an array.

Optionally, the second backlight module 10F may include a driving base 10F1 and mini light-emitting diodes 1031 or micro light-emitting diodes 1032 disposed on opposite sides of the driving base 10F1. In other words, a plurality of mini light-emitting diodes 1031 or micro light-emitting diodes 1032 electrically connected to the driving base 10F1 may be disposed on a side of the driving base 10F1 close to the third liquid crystal display panel 10D, and a plurality of mini light-emitting diodes 1031 or micro light-emitting diodes 1032 electrically connected to the driving base 10F1 may also be disposed on another side of the driving base 10F1 close to the fourth liquid crystal display panel 10E. Therefore, the same one second backlight module 10F may provide backlight source for the third liquid crystal display panel 10D and the fourth liquid crystal display panel 10E together.

Optionally, the third liquid crystal display panel 10D may include a third array substrate 10D1 and a third color filter substrate 10D2 that are oppositely disposed, and a third liquid crystal layer 10D3 disposed between the third array substrate 10D1 and the third color filter substrate 10D2. The fourth liquid crystal display panel 10E may include a fourth array substrate 10E1 and a fourth color filter substrate 10E2 that are oppositely disposed, and a fourth liquid crystal layer 10E3 disposed between the fourth array substrate 10E1 and the fourth color filter substrate 10E2. The third liquid crystal display panel 10D may include the first light-exiting surface E1, and the fourth liquid crystal display panel 10E may include the second light-exiting surface E2.

In the disclosed double-sided display module 10, the third liquid crystal display panel 10D and the fourth liquid crystal display panel 10E may share the second backlight module 10F, which may facilitate to reduce the overall thickness of the double-sided display module 10. The second backlight module 10F may include a plurality of mini light-emitting diodes 1031 arranged in an array or a plurality of micro light-emitting diodes 1032 arranged in an array, which may be featured with advantages such as low power consumption, high brightness, ultra-high resolution and color saturation, fast response speed, super power saving, substantially long service life, substantially high efficiency, etc.

It should be noted that the specific structures of the third liquid crystal display panel 10D, the second backlight module 10F, and the fourth liquid crystal display panel 10E may not be described in detail in the present disclosure. For example, the third color filter substrate 10D2 and the fourth color filter substrate 10E2 each may include a black matrix layer and a color resist layer, and the third array substrate 10D1 and the fourth array substrate 10E1 each may include a driving transistor array layer, an electrode layer, etc., which may refer to the structures of a liquid crystal display panel and a backlight module that provides a backlight source for the liquid crystal display panel in the related art.

Figure 8:
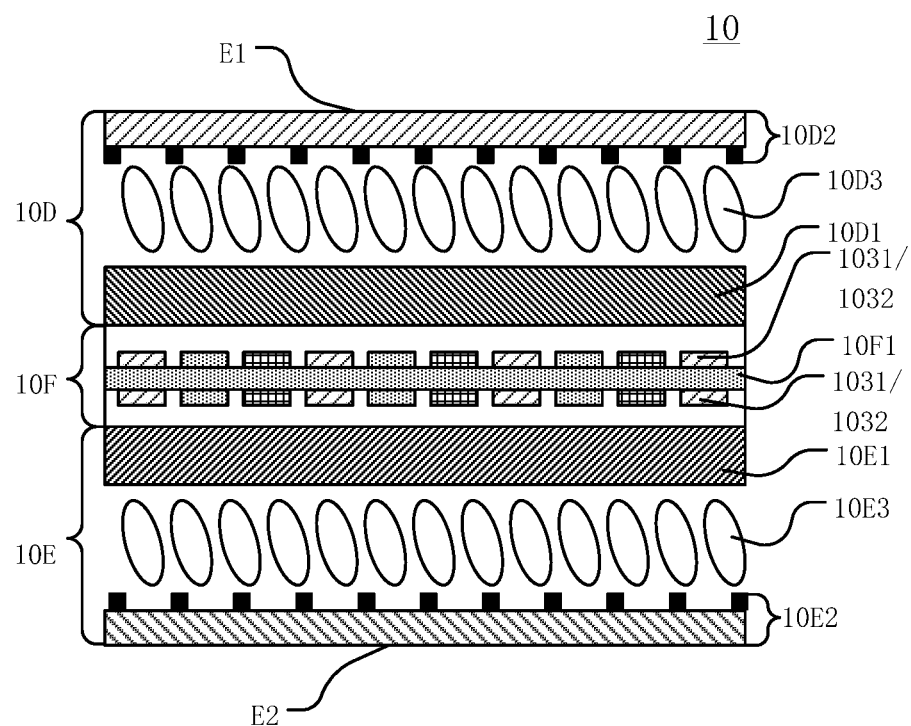
FIG. 8 illustrates a schematic local cross-sectional view of another exemplary double-sided display module consistent with disclosed embodiments of the present disclosure.

FIG. 8 illustrates a schematic local cross-sectional view of another double-sided display module consistent with disclosed embodiments of the present disclosure. In certain embodiments, referring to FIG. 8, the double-sided display module 10 may include the third liquid crystal display panel 10D, the second backlight module 10F, and the fourth liquid crystal display panel 10E that are laminated to fit each other. The second backlight module 10F may include a plurality of mini light-emitting diodes 1031 arranged in an array, or a plurality of micro light-emitting diodes 1032 arranged in an array. The third liquid crystal display panel 10D may include the first light-exiting surface E1, and the fourth liquid crystal display panel 10E may include the second light-exiting surface E2. The mini light-emitting diodes 1031 or the micro light-emitting diodes 1032 of the second backlight module 10F may include at least three colors, and the third liquid crystal display panel 10D and the fourth liquid crystal display panel 10E each may not include a color resist layer.

The present disclosure may explain that the double-sided display module 10 may be a liquid crystal double-sided display screen with a backlight module. In other words, the double-sided display module 10 may include the third liquid crystal display panel 10D, the second backlight module 10F, and the fourth liquid crystal display panel 10E that are laminated to fit each other. The second backlight module 10F may be a direct back-lit module, and may include a plurality of mini light-emitting diodes 1031 arranged in an array, or a plurality of micro light-emitting diodes 1032 arranged in an array. The mini light-emitting diodes 1031 or the micro light-emitting diodes 1032 of the second backlight module 10F may include at least three colors, and the third color film substrate 10D2 of the third liquid crystal display panel 10D and the fourth color filter substrate 10E2 of the fourth liquid crystal display panel 10E each may not include a color resist layer for color filtering. Optionally, the third color filter substrate 10D2 and the fourth color filter substrate 10E2 each may still retain the black matrix layer for shading, such that the overall thickness of the double-sided display module 10 may be further reduced.

Figure 9:
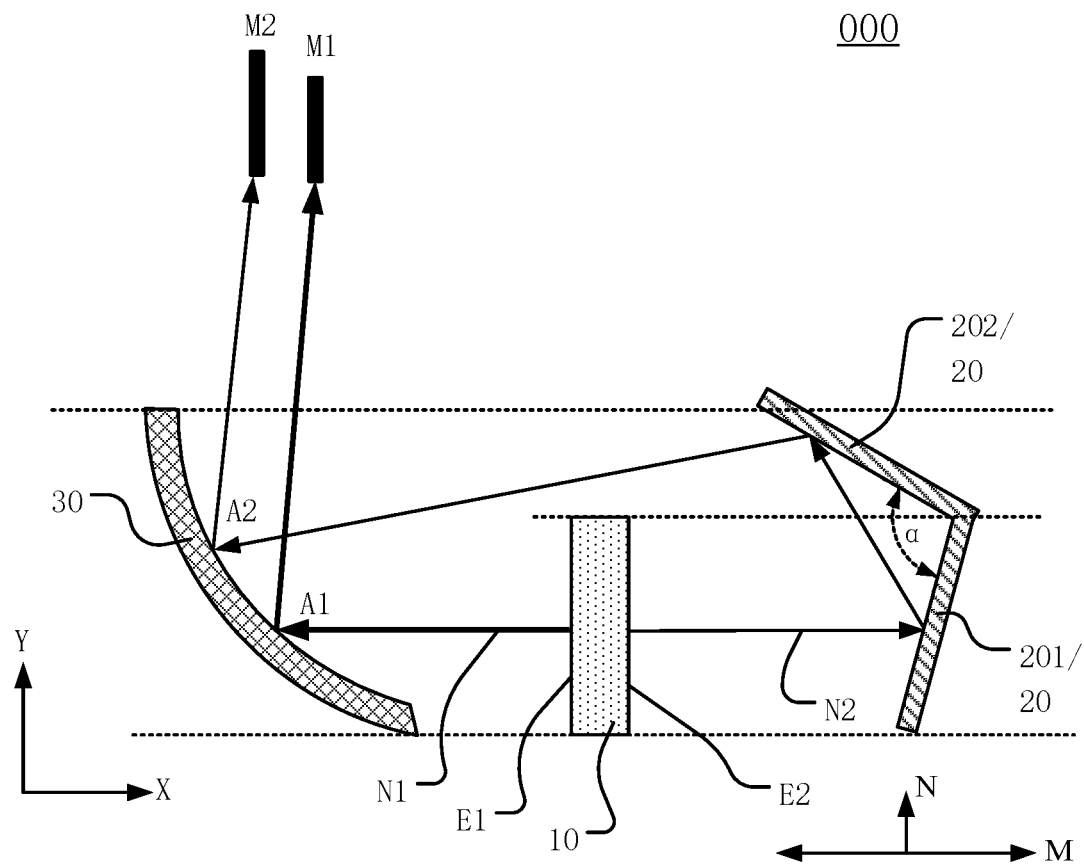
FIG. 9 illustrates a schematic diagram of another exemplary display device consistent with disclosed embodiments of the present disclosure.

FIG. 9 illustrates a schematic diagram of another display device consistent with disclosed embodiments of the present disclosure. In certain embodiments, referring to FIG. 9, along the first direction M, the reflective component 20 may be disposed on a side of the double-sided display module 10 away from the curved mirror 30. The first direction M may be perpendicular to a plane of the first light-exiting surface E1. Optionally, the second direction N may be parallel to the plane of the first light-exiting surface E1.

The reflective component 20 may include a first plane mirror 201 and a second plane mirror 202. The first plane mirror 201 and the second plane mirror 202 may be connected to and intersect each other. Optionally, the first plane mirror 201 and the second plane mirror 202 may be an integral structure.

The light N1 emitted from the first light-exiting surface E1 of the double-sided display module 10 may be directly projected to the first position A1 on the curved mirror 30 along the first direction M. The light N2 emitted from the second light-exiting surface E2 of the double-sided display module 10 may be sequentially reflected by the first plane mirror 201 and the second plane mirror 202, and then may be projected to the second position A2 on the curved mirror 30.

The present disclosure may explain that along the first direction M, in other words, in the arrangement direction of the double-sided display module 10 and the curved mirror 30, the reflective component 20 may be disposed on the side of the double-sided display module 10 away from the curved mirror 30. The first direction M may be perpendicular to the plane of the first light-exiting surface E1, such that the light N1 emitted from the first light-exiting surface E1 of the double-sided display module 10 may be directly projected to the first position A1 on the curved mirror 30 as much as possible, which may facilitate to improve the imaging quality of the first virtual image M1 formed by the display device 000. Because the first light-exiting surface E1 faces the curved mirror 30, and the second light-exiting surface E2 and the first light-exiting surface E1 are disposed opposite to each other, the light N2 emitted from the second light-exiting surface E2 may first need to be reflected by the reflective component 20, and then may be projected to the second position A2 that does not overlap the first position A1 on the curved mirror 30.

In the present disclosure, the reflective component 20 may include the first plane mirror 201 and the second plane mirror 202. The first plane mirror 201 and the second plane mirror 202 may be connected to and intersect each other. Optionally, the first plane mirror 201 and the second plane mirror 202 may be an integral structure. The reflective surface of the reflective component 20 composed of the first plane mirror 201 and the second plane mirror 202 may face the second light-exiting surface E2 of the double-sided display module 10. Therefore, through the cooperation of the reflective optical paths of the first plane mirror 201 and the second plane mirror 202 that intersect each other, the light N2 emitted from the second light-exiting surface E2 of the double-sided display module 10 may be sequentially reflected by the first plane mirror 201 and the second plane mirror 202, and then may be projected to the second position A2 on the curved mirror 30. Ultimately, the first virtual image M1 and the second virtual image M2 may be formed by the curved reflection of the curved mirror 30.

In the present disclosure, the placement manner of the double-sided display module 10 may be substantially simple. As long as the first direction M is perpendicular to the plane of the first light-exiting surface E1, the design of the optical path of the light emitted from the second light-exiting surface E2 may be achieved through the first plane mirror 201 and the second plane mirror 202 that intersect each other, thereby achieving the effect of forming two virtual images with different distances.

It should be understood that the intersection angle between the first plane mirror 201 and the second plane mirror 202 that intersect each other may not be limited by the present disclosure. Based on the above-disclosed embodiments, the intersection angle α between the first plane mirror 201 and the second plane mirror 202 may be in a range of approximately 45°-135°, and both the reflective surface of the first plane mirror 201 and the reflective surface of the second plane mirror 202 may face the double-sided display module 10. In one embodiment, the reflective surface of the first plane mirror 201 and the reflective surface of the second plane mirror 202 may face the second light-exiting surface E2 of the double-sided display module 10. Further, the intersection angle α between the first plane mirror 201 and the second plane mirror 202 may face the second light-exiting surface E2 of the double-sided display module 10.

The present disclosure may explain that the intersection angle α between the first plane mirror 201 and the second plane mirror 202 may be in a range of approximately 45°-135°, such that the light N2 emitted from the second light-exiting surface E2 may be projected to the first plane mirror 201 of the reflective component 20 along the first direction M or a direction with a substantially small angle with respect to the first direction M, thereby ensuring that after being reflected by the reflective component 20, the light N2 emitted from the second light-exiting surface E2 may be projected to the curved mirror 30, which may facilitate to avoid the picture defects of the second virtual image caused by the loss of light emitted from the second light-exiting surface E2 as much as possible, and to improve the imaging quality.

Figure 10:
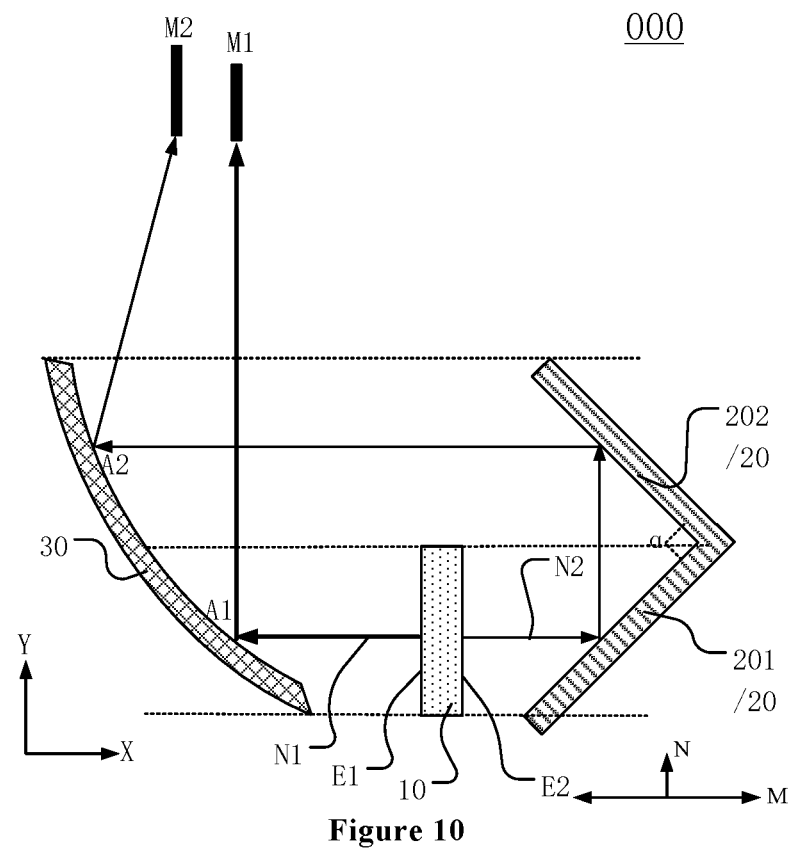
FIG. 10 illustrates a schematic diagram of another exemplary display device consistent with disclosed embodiments of the present disclosure.

FIG. 10 illustrates a schematic diagram of another display device consistent with disclosed embodiments of the present disclosure. Optionally, referring to FIG. 10, the intersection angle α between the first plane mirror 201 and the second plane mirror 202 may be approximately 90° In other words, the first plane mirror 201 and the second plane mirror 202 may be perpendicular to each other, such that the light emitted from the first light-exiting surface E1 and the second light-exiting surface E2 of the double-sided display module 10 may be emitted along the first direction M as much as possible, which may further avoid loss of light.

Optionally, the lower edge of the double-sided display module 10, the lower edge of the curved mirror 30, and the lower edge of the first plane mirror 201 may be coplanar with each other (as shown by the dotted line in FIG. 9). Alternatively, the lower edge of the double-sided display module 10 may be higher than the lower edge of the curved mirror 30, and the lower edge of the double-sided display module 10 may be higher than the lower edge of the first plane mirror 201. Therefore, the light emitted from the first light-exiting surface E1 of the double-sided display module 10 may be projected to the curved mirror 30 as much as possible, and the light emitted from the second light-exiting surface E2 of the double-sided display module 10 may be projected to the first plane mirror 201 as much as possible.

The upper edge of the double-sided display module 10 may be coplanar with or lower than the intersection between the first plane mirror 201 and the second plane mirror 202 (as shown by the dashed line in FIG. 9). Therefore, the light emitted from the second light-exiting surface E2 of the double-sided display module 10 may be prevented from being projected to the second plane mirror 202 to generate interference. The upper edge of the curved mirror 30 may be coplanar with the upper edge of the second plane mirror 202 (as shown by the dashed line in FIG. 9), or the upper edge of the curved mirror 30 may be higher than the upper edge of the second plane mirror 202. Therefore, after being reflected by the second plane mirror 202, the light emitted from the second light-exiting surface E2 of the double-sided display module 10 may be projected to the curved mirror 30 as much as possible, thereby avoiding light loss and improving light utilization.

Figure 11:
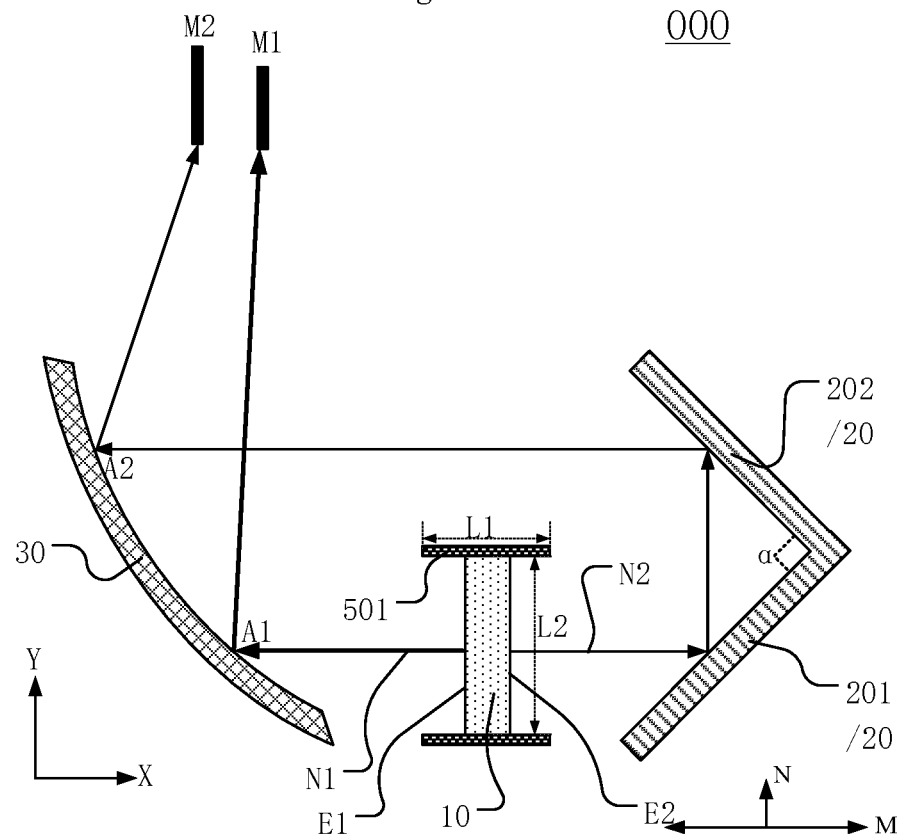
FIG. 11 illustrates a schematic diagram of another exemplary display device consistent with disclosed embodiments of the present disclosure.

FIG. 11 illustrates a schematic diagram of another display device consistent with disclosed embodiments of the present disclosure. In certain embodiments, referring to FIG. 11, along the second direction N, first light-shielding plates 501 may be disposed on both sides of the double-sided display module 10, respectively. Optionally, the first light-shielding plate 501 may be made of any material that is opaque and has a light-shielding effect, which may not be limited by the present disclosure.

Along the first direction M, the first light-shielding plate 501 may have a length of L1. Along the second direction N, the double-sided display module 10 may have a length of L2, where L1=A×L2, and the value of A may be in a range of approximately 5%-20%.

The present disclosure may explain that in the arrangement direction of the double-sided display module 10 and the curved mirror 30 (i.e., the first direction M), the reflective component 20 may be disposed on the side of the double-sided display module 10 away from the curved mirror 30. When the first direction M is perpendicular to the plane of the light-exiting surface E1, the first light-shielding plates 501 (as shown in FIG. 11) may be fixedly disposed on both sides of the double-sided display module 10. A quantity of the first light-shielding plates 501 may be two, and the two first light-shielding plates 501 may be disposed on both sides of the double-sided display module 10 in the second direction N, respectively. The two first light-shielding plates 501 may be configured to prevent the light emitted from the double-sided display module 10 from being diverged.

Optionally, because the double-sided display module 10 includes the first light-exiting surface E1 and the second light-exiting surface E2, the first light-shielding plate 501 may be centrally disposed on the side of the double-sided display module 10. In other words, along the first direction M, a distance from one end of the first light-shielding plate 501 to the first light-exiting surface E1 may be equal to a distance from the other end of the first light-shielding plate 501 to the second light-exiting surface E2. Therefore, the light emitted from both the first and second light-exiting surfaces may be effectively shielded, which may be prevented from being diverged on both sides.

In the present disclosure, the first light-shielding plate 501 may prevent the light emitted from both the first light-exiting surface E1 and the second light-exiting surface E2 from being too divergent, and may prevent the light emitted from the double-sided display module 10 from being diverged to the outside of the display device and from affecting the light output rate of the double-sided display module 10, which may cause light loss and affect the imaging quality.

Optionally, if the display device 000 in the present disclosure is applied to a vehicle head-up display, the light emitted to the outside of the display device 000 may be likely to enter the field of view of the observer after being reflected by some reflective elements in the vehicle, which may cause stray light and affect driving safety. Therefore, in the present disclosure, through fixedly disposing the first light-shielding plates 501 on both sides of the double-sided display module 10, the light emitted from the first light-exiting surface E1 and the second light-exiting surface E2 may be prevented from being diverged to generate stray light.

Optionally, along the first direction M, the first light-shielding plate 501 may have the length of L1, and along the second direction N, the double-sided display module 10 may have the length of L2, where L1=A×L2, and the value of A may be in a range of approximately 5%-20%. In one embodiment, A may be 10%. In other words, the length L1 of the first light-shielding plate 501 in the first direction M may be A times of the length L2 of the double-sided display module 10 in the second direction N, where the value of A may be in a range of approximately 5%-20%. In one embodiment, A may be 10%. Therefore, while ensuring the shading effect, the length L1 of the first light-shielding plate 501 in the first direction M may be prevented from being too large to affect the volume of the device, which may facilitate to reduce the volume of the device.

Figure 12:
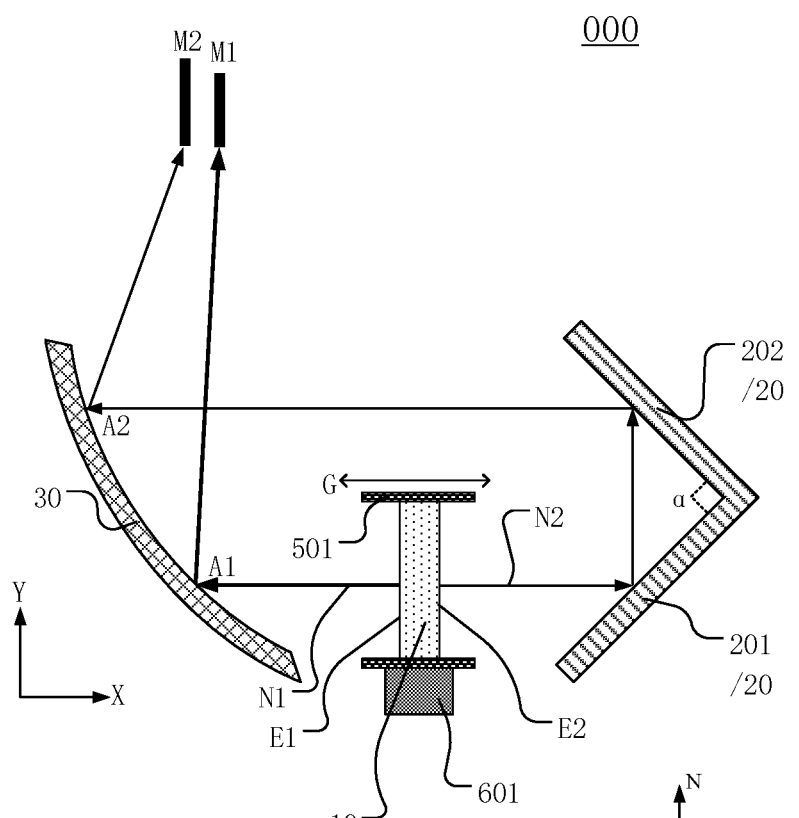
FIG. 12 illustrates a schematic diagram of another exemplary display device consistent with disclosed embodiments of the present disclosure.
Figure 13:
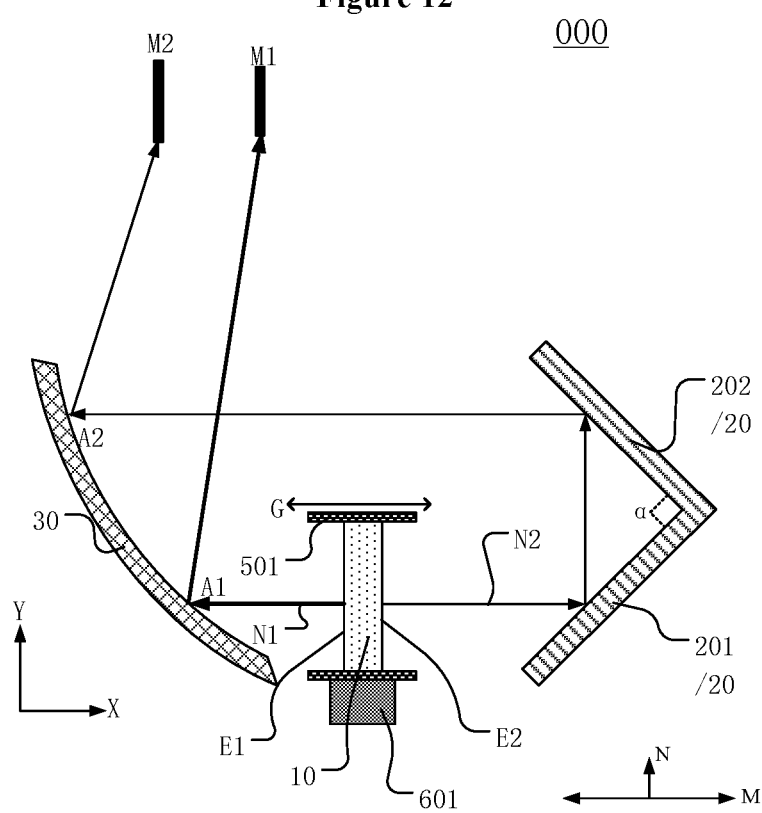
FIG. 13 illustrates a schematic diagram of another exemplary display device consistent with disclosed embodiments of the present disclosure.
Figure 14:
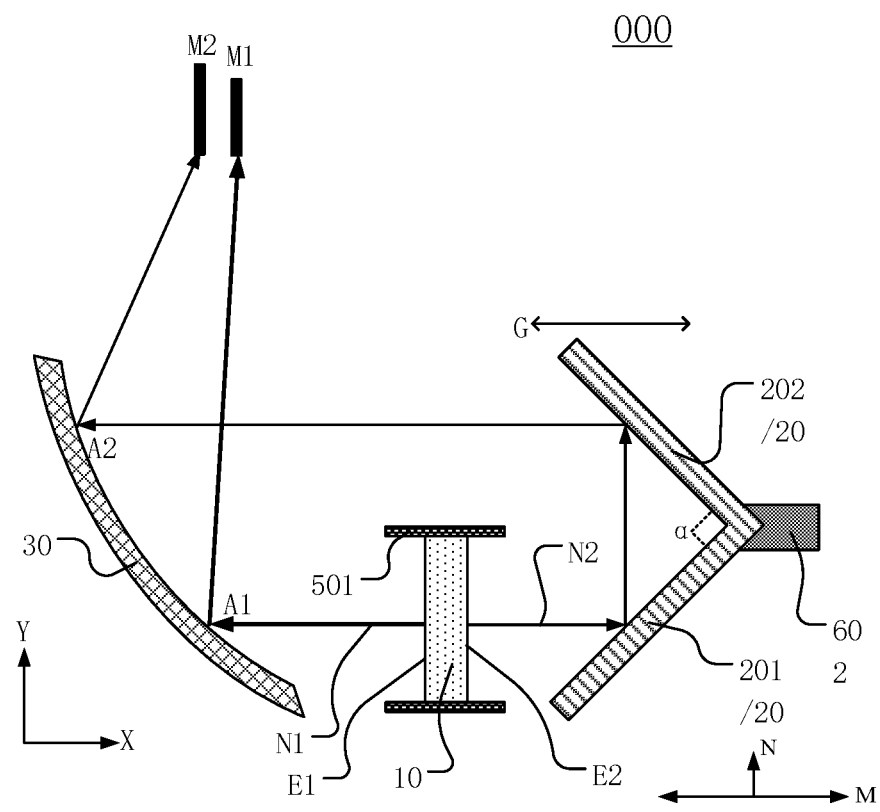
FIG. 14 illustrates a schematic diagram of another exemplary display device consistent with disclosed embodiments of the present disclosure.
Figure 15:
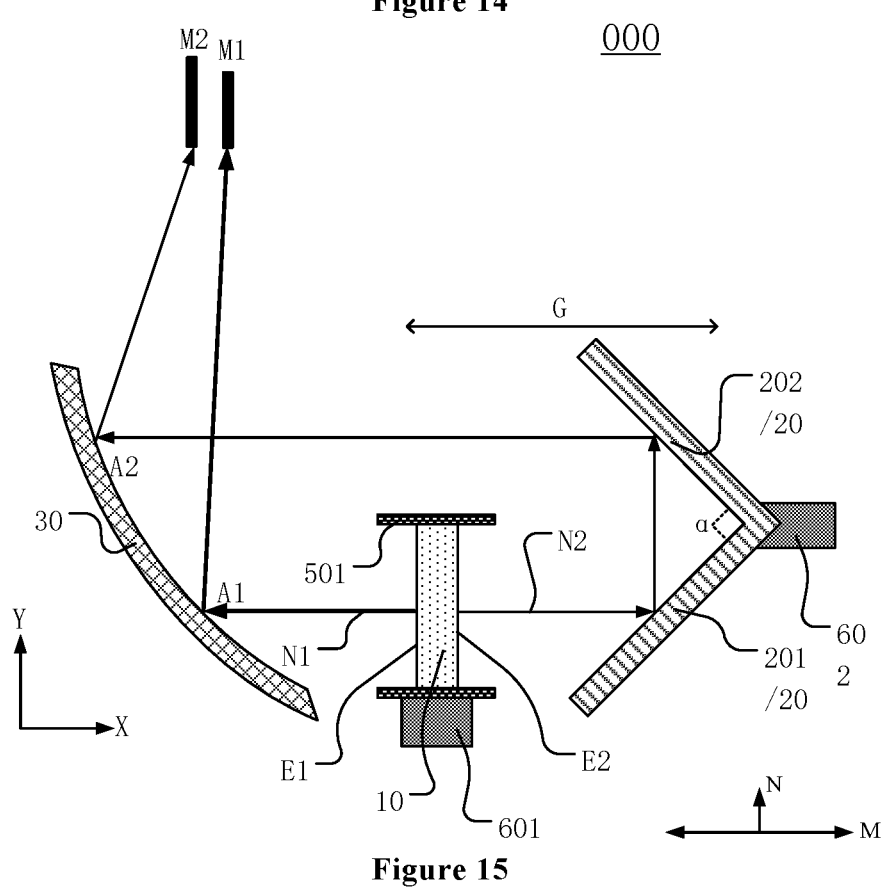
FIG. 15 illustrates a schematic diagram of another exemplary display device consistent with disclosed embodiments of the present disclosure.

FIG. 12 illustrates a schematic diagram of another display device consistent with disclosed embodiments of the present disclosure; FIG. 13 illustrates a schematic diagram of another display device consistent with disclosed embodiments of the present disclosure; FIG. 14 illustrates a schematic diagram of another display device consistent with disclosed embodiments of the present disclosure; and FIG. 15 illustrates a schematic diagram of another display device consistent with disclosed embodiments of the present disclosure. In certain embodiments, referring to FIGS. 12-15, the double-sided display module 10 may be connected with a first motor 601. The first motor 601 may control the double-sided display module 10 to move in the first direction M (as shown in FIGS. 12-13). In another embodiment, the reflective component 20 may be connected with a second motor 602, and the second motor 602 may control the reflective component 20 to move in the first direction M (as shown in FIG. 14).

In certain embodiments, the double-sided display module 10 may be connected with the first motor 601, and the reflective component 20 may be connected with the second motor 602. The first motor 601 may control the double-sided display module 10 to move in the first direction M, and the second motor 602 may control the reflective component 20 to move in the first direction M (as shown in FIG. 15).

Referring to FIG. 12, the double-sided display module 10 may be connected with the first motor 601, and the double-sided display module 10 may be controlled to move back and forth in the first direction M through the first motor 601, where the moving direction may be shown by an arrow G in FIG. 12. Therefore, the double-sided display module 10 may move under the control of the first motor 601, thereby controlling the imaging distances of the first virtual image M1 and the second virtual image M2. Optionally, if the display device 000 in the present disclosure is applied to a vehicle head-up display, according to the height difference and sitting habits of the observer in the vehicle, the double-sided display module 10 may be driven by the first motor 601 to move back and forth in the direction G, to adjust the different imaging distances of the first virtual image M1 and the second virtual image M2. Therefore, the requirements of different observers may be satisfied, and adjustability may be strong, which may facilitate to improve user experience satisfaction.

When the light forming the first virtual image M1 is projected to the curved mirror 30, the total object distance u1 may be the distance from the first light-exiting surface E1 to the curved mirror 30. When the light forming the second virtual image M2 is projected to the curved mirror 30, the total object distance u2 may be the sum of the distance from the second light-exiting surface E2 to the first plane mirror 201, the distance from the first plane mirror 201 to the second plane mirror 202, and the distance from the second plane mirror 202 to the curved mirror 30, where u2>u1.

For the same curved mirror 30, when the object distance is less than a focal length, the larger the object distance, the larger the imaging distance. A focal length of the curved mirror with a curved radius of R may be approximately R/2, and in the present disclosure, the object distance may be less than the focal length. Therefore, the second virtual image M2 may be farther from the front windshield (which is not illustrated in FIG. 12, and may be understood by referring to the position of the front windshield in FIG. 2), and the first virtual image M1 may be closer to the front windshield. If the first motor 601 controls the double-sided display module 10 to move towards the curved mirror 30 (as shown in FIG. 13), the object distance u1 may further decrease, and the imaging distance of the first virtual image M1 may also decrease accordingly; and the object distance u2 may further increase, and the imaging distance of the second virtual image M2 may also increase accordingly. In view of this, the distance between the first virtual image M1 and the second virtual image M2 may increases accordingly, to achieve the adjustment of the imaging distance through the first motor 601.

Referring to FIG. 14, in one embodiment, to achieve the adjustment of the imaging distance, the reflective component 20 may be connected with the second motor 602. The second motor 602 may control the reflective component 20 to move in the first direction M, thereby changing the object distance u2. The principle associated with FIG. 14 may be similar to the principle of controlling the movement of the double-sided display module 10 through the first motor 601, which may not be repeated herein.

Referring to FIG. 15, in one embodiment, to achieve the adjustment of the imaging distance, the double-sided display module 10 may be connected with the first motor 601, and the reflective component 20 may be connected with the second motor 602. The double-sided display module 10 and the reflective component 20 may move together, to achieve a substantially flexible adjustment of the imaging distance.

It should be noted that the models and working voltages of the first motor 601 and the second motor 602 may not be specifically limited by the present disclosure, and may be selectively set according to the volume size and operating status of the device in practical applications. As long as the first motor 601 is capable of driving the double-sided display module 10 to move, and the second motor 602 is capable of driving the reflective component 20 to move, which may not be limited by the present disclosure.

Figure 16:
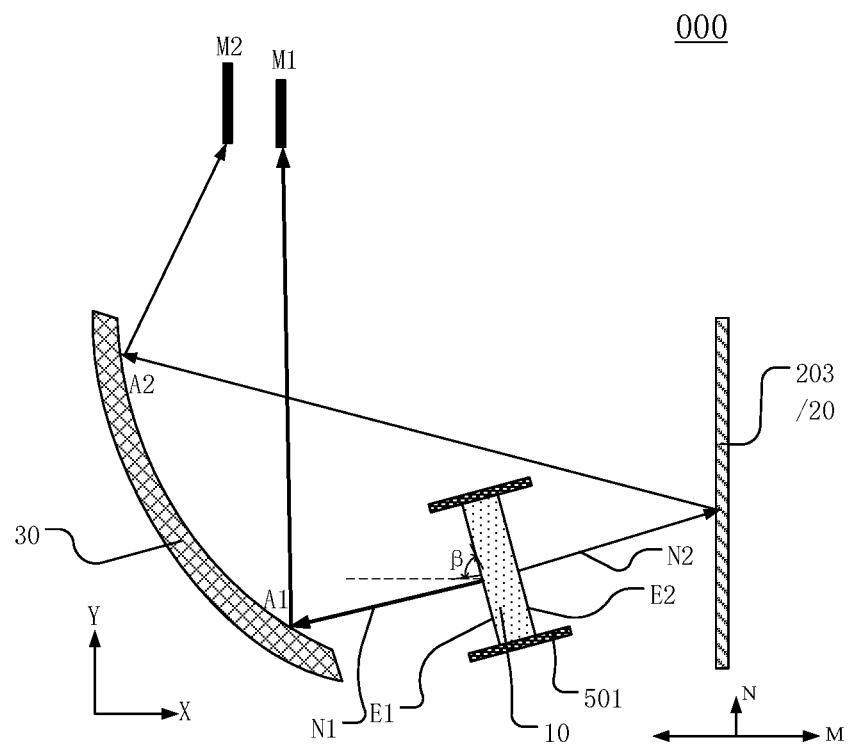
FIG. 16 illustrates a schematic diagram of another exemplary display device consistent with disclosed embodiments of the present disclosure.

FIG. 16 illustrates a schematic diagram of another display device consistent with disclosed embodiments of the present disclosure. In certain embodiments, referring to FIG. 16, in the disclosed display device 000, the reflective component 20 may at least include a third plane mirror 203. The reflective surface of the third plane mirror 203 may face towards the second light-exiting surface E2. The first direction M may intersect the plane of the first light-exiting surface E1 at an angle β. Optionally, the angle β may be an acute angle.

The light N1 emitted from the first light-exiting surface E1 of the double-sided display module 10 may be directly projected to the first position A1 on the curved mirror 30 along the first direction M. The light N2 emitted from the second light-exiting surface E2 of the double-sided display module 10 may be projected to the second position A2 on the curved mirror 30 after being reflected by the third plane mirror 203.

The present disclosure may explain that the reflective component 20 may include at least one third plane mirror 203, and the double-sided display module 10 may be disposed obliquely. In other words, the reflective surface of the third plane mirror 203 may face towards the second light-exiting surface E2, and the first direction M may intersect the plane of the first light-exiting surface E1 at an angle (3, where the angle (3 may be an acute angle. The first light-exiting surface E1 may still face the curved mirror 30, such that the light N1 emitted from the first light-exiting surface E1 of the double-sided display module 10 may be directly projected to the first position A1 on the curved mirror 30 along the first direction M. The light N2 emitted from the second light-exiting surface E2 of the double-sided display module 10 may be projected to the second position A2 on the curved mirror 30 after being reflected by the third plane mirror 203, to achieve imaging of two virtual images with different distances. The volume of the entire display device may be further reduced by reducing the volume of the reflective component 20, and the cost may be reduced.

Figure 17:
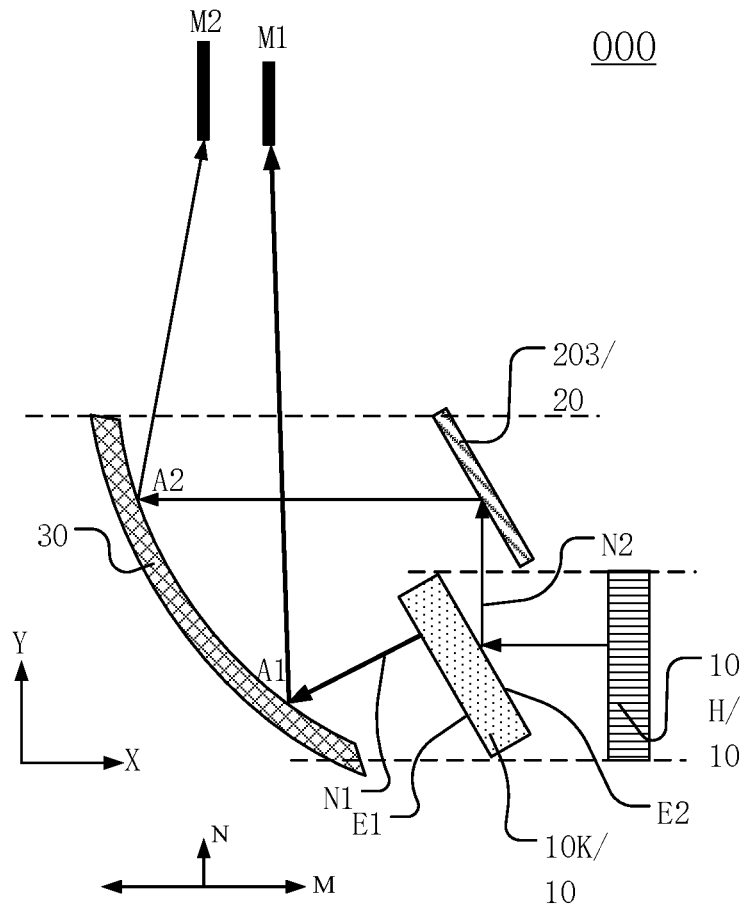
FIG. 17 illustrates a schematic diagram of another exemplary display device consistent with disclosed embodiments of the present disclosure.
Figure 18:
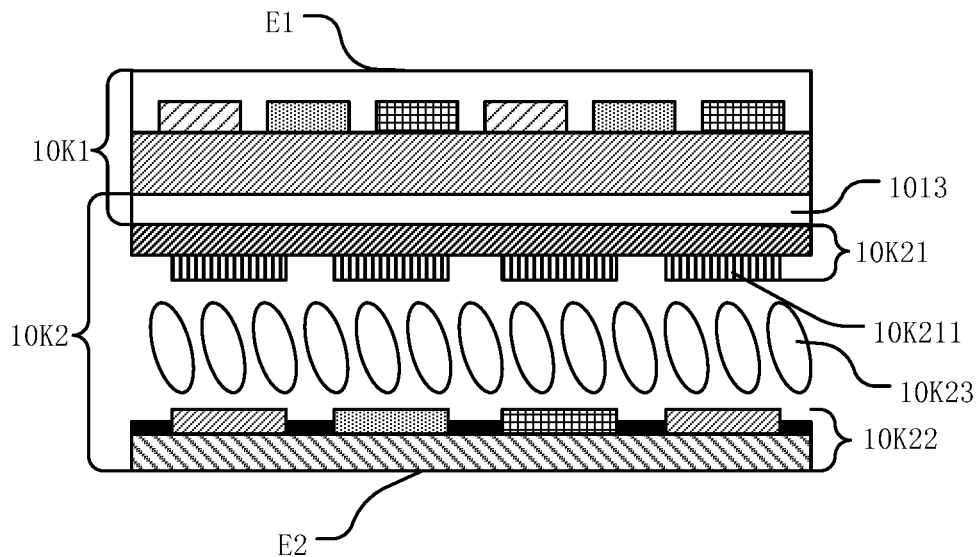
FIG. 18 illustrates a schematic local cross-sectional view of an exemplary double-sided display panel consistent with disclosed embodiments of the present disclosure.

FIG. 17 illustrates a schematic diagram of another display device consistent with disclosed embodiments of the present disclosure; and FIG. 18 illustrates a schematic local cross-sectional view of a double-sided display panel consistent with disclosed embodiments of the present disclosure. In certain embodiments, referring to FIG. 17 and FIG. 18, the double-sided display module 10 of the display device 000 may include a first self-luminous light-emitting display panel 10K1 and a first reflective liquid crystal display panel 10K2 that are independent of each other and are laminated to fit each other, and a third backlight module 10H. Along the first direction M, the third backlight module 10H may be disposed on a side of the first reflective liquid crystal display panel 10K2 away from the curved mirror 30. A light-exiting surface of the first self-luminous light-emitting display panel 10K1 may be the first light-exiting surface E1, and a light-exiting surface of the first reflective liquid crystal display panel 10K2 may be the second light-exiting surface E2.

The present disclosure may explain that the double-sided display module 10 may be a double-sided display screen with backlight. In other words, the double-sided display module 10 may include the first self-luminous light-emitting display panel 10K1 and the first reflective liquid crystal display panel 10K2 that are independent of each other and are laminated to fit each other, and the third backlight module 10H. Along the first direction M, the third backlight module 10H may be disposed on the side of the first reflective liquid crystal display panel 10K2 away from the curved mirror 30. The third backlight module 10H may be configured to provide a backlight source for the first reflective liquid crystal display panel 10K2. After the first light-exiting surface E1 and the second light-exiting surface E2 of the double-sided display module 10 display images, the light N1 emitted from the first light-exiting surface E1 of the double-sided display module 10 may be directly projected to the first position A1 on the curved mirror 30 along the first direction M, and the light N2 emitted from the second light-exiting surface E2 of the double-sided display module 10 may be projected to the second position A2 on the curved mirror 30 after being reflected by the third plane mirror 203. Therefore, the two virtual images with different distances may be imaged, and the volume of the entire display device may be further reduced by reducing the volume of the reflective component 20, which may reduce the cost.

Because the double-sided display panel 10K composed of the first self-luminous light-emitting display panel 10K1 and the first reflective liquid crystal display panel 10K2 and the third backlight module 10H are independent of and spaced apart from each other, while ensuring the double-sided display effect of the double-sided display module 10 by providing the backlight function for the first reflective liquid crystal display panel 10K, the double-sided display module 10 may also have a certain heat dissipation effect.

The third backlight module 10H may be any one of a direct back-lit module or an edge back-lit module, which may not be limited by the present disclosure. Optionally, the double-sided display panel 10K may include the first self-luminous light-emitting display panel 10K1 and the first reflective liquid crystal display panel 10K2 that are laminated to fit each other. The light-exiting surface of the first self-luminous light-emitting display panel 10K1 may be the first light-exiting surface E1, and the light-exiting surface of the first reflective liquid crystal display panel 10K2 may be the second light-exiting surface E2. The first self-luminous light-emitting display panel 10K1 may be the micro light-emitting diode display panel or the mini light-emitting diode display panel illustrated in FIG. 3, the organic light-emitting diode display panel illustrated in FIG. 4, or the quantum dot light-emitting diode display panel illustrated in FIG. 5.

In the disclosed embodiments, the structure of the first self-luminous light-emitting display panel 10K1 may not be described in detail, which may refer to the above description of the structure in the embodiments associated with FIGS. 3-5. The first reflective liquid crystal display panel 10K2 may include a substrate base 1013, a fifth array substrate 10K21, a fifth liquid crystal layer 10K23, and a fifth color filter substrate 10K22 that are sequentially disposed. The fifth array substrate 10K21 may include a first reflective layer 10K211. Optionally, the substrate base 1013 may be shared by the first self-luminous light-emitting display panel 10K1 and the first reflective liquid crystal display panel 10K2, which may facilitate to thin the display screen. The first reflective liquid crystal display panel 10K2 in the present disclosure may have the function of a reflective liquid crystal display panel. The ambient light and the third backlight module 10H may be used to provide a backlight source for the first reflective liquid crystal display panel 10K2, which may facilitate to reduce power consumption of display.

It should be understood that the specific structure of the first reflective liquid crystal display panel 10K2 and the third backlight module 10H may not be described in detail in the present disclosure, which may refer to the structure of the reflective liquid crystal display panel in the related art for understanding.

Optionally, the lower edge of the double-sided display module 10, the lower edge of the curved mirror 30, and the lower edge of the third backlight module 10H may be coplanar with each other (as shown by the dashed line in FIG. 17). Alternatively, the lower edge of the double-sided display module 10 may be higher than the lower edge of the curved mirror 30, and the lower edge of the double-sided display module 10 may be higher than the lower edge of the third backlight module 10H. Therefore, the light emitted from the first light-exiting surface E1 of the double-sided display module 10 may be projected to the curved mirror 30 as much as possible. The upper edge of the third backlight module 10H may be coplanar with the upper edge of the double-sided display module 10, such that the light emitted from the third backlight module 10H may be projected to the second light-exiting surface E2 of the double-sided display module 10 as much as possible. The lower edge of the third plane mirror 203 may be coplanar with or higher than the upper edges of the double-sided display module 10 and the third backlight module 10H (as shown in FIG. 17), such that the third plane mirror 203 may be prevented from shielding the light. The upper edge of the third plane mirror 203 may be coplanar with the upper edge of the curved mirror 30 (as shown by the dotted line in FIG. 17), or the upper edge of the third plane mirror 203 may be lower than the upper edge of the curved mirror 30. Therefore, the light emitted from the second light-exiting surface E2 of the double-sided display module 10 may be projected to the curved mirror 30 as much as possible after being reflected by the third plane mirror 203, which may avoid light loss and improve light utilization.

Figure 19:
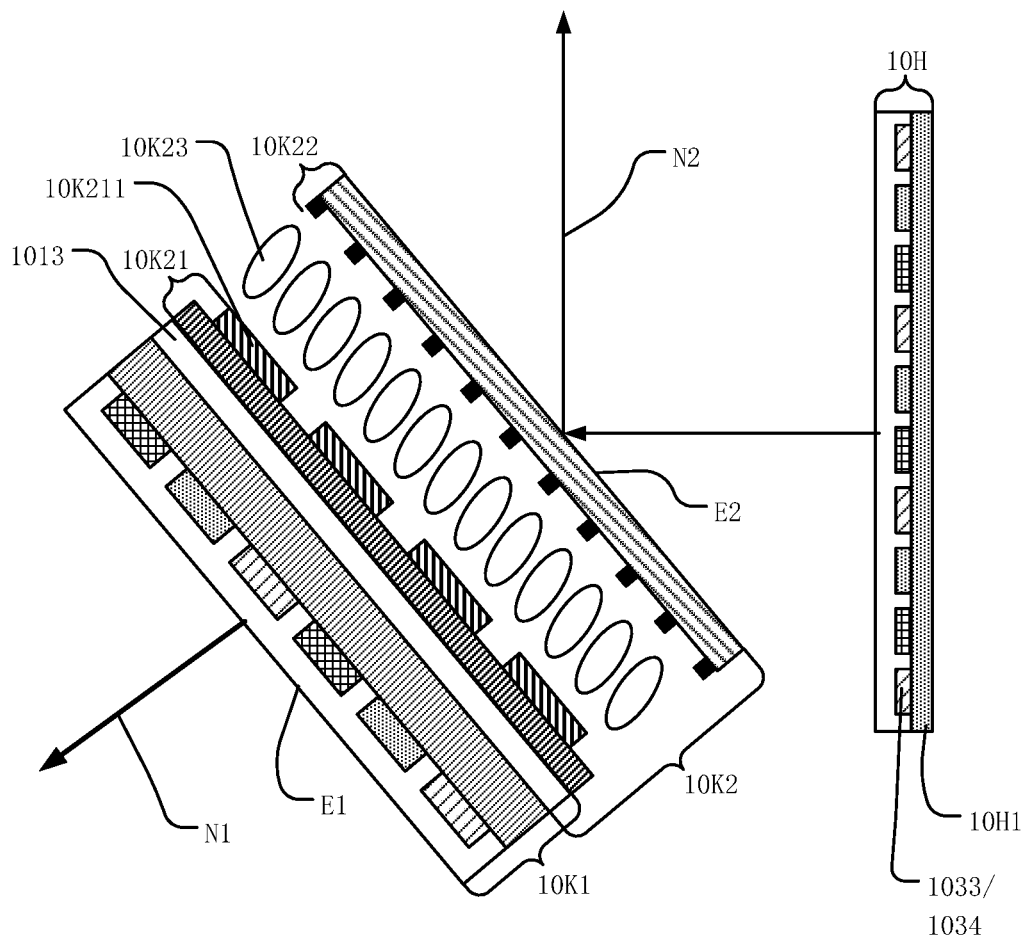
FIG. 19 illustrates a schematic local cross-sectional view of a double-sided display panel and a third backlight module in FIG. 17 consistent with disclosed embodiments of the present disclosure.

FIG. 19 illustrates a schematic local cross-sectional view of the double-sided display panel and the third backlight module in FIG. 17 consistent with disclosed embodiments of the present disclosure. In certain embodiments, referring to FIG. 17 and FIG. 19, the third backlight module 10H may include a plurality of mini light-emitting diodes 1033 arranged in an array or a plurality of micro light-emitting diodes 1034 arranged in an array. The mini light-emitting diodes 1033 or the micro light-emitting diodes 1034 may include at least three colors, and the first reflective liquid crystal display panel 10K2 may not include the color resist layer.

The present disclosure may explain that the double-sided display module 10 may be a double-sided display screen with a backlight module. In other words, the double-sided display module 10 may include the double-sided display panel 10K and the third backlight module 10H that are independent of each other. The double-sided display panel 10K may include the first self-luminous light-emitting display panel 10K1 and the first reflective liquid crystal display panel 10K2 that are laminated to fit each other. In the first direction M, the third backlight module 10H may be disposed on the side of the first reflective liquid crystal display panel 10K2 away from the curved mirror 30. The third backlight module 10H may be a direct back-lit module, and may include a plurality of mini light-emitting diodes 1033 arranged in an array or a plurality of micro light-emitting diodes 1034 arranged in an array. The third backlight module 10H may include a driving base 10H1 and the plurality of mini light-emitting diodes 1033 or micro light-emitting diodes 1034 disposed on the side of the driving base 10H1 close to the first reflective liquid crystal display panel 10K2. In other words, the plurality of mini light-emitting diodes 1033 or micro light-emitting diodes 1034 electrically connected to the driving base 10H1 may be disposed on the side of the driving base 10H1 close to the first reflective liquid crystal display panel 10K2. The mini light-emitting diodes 1033 or micro light-emitting diodes 1034 of the third backlight module 10H in the present disclosure may include at least three colors. The fifth color filter substrate 10K22 of the first reflective liquid crystal display panel 10K2 may not include the color resist layer, therefore, the thickness of the double-sided display panel 10K may be further reduced, and the volume of the double-sided display module 10 may be further reduced.

Figure 20:
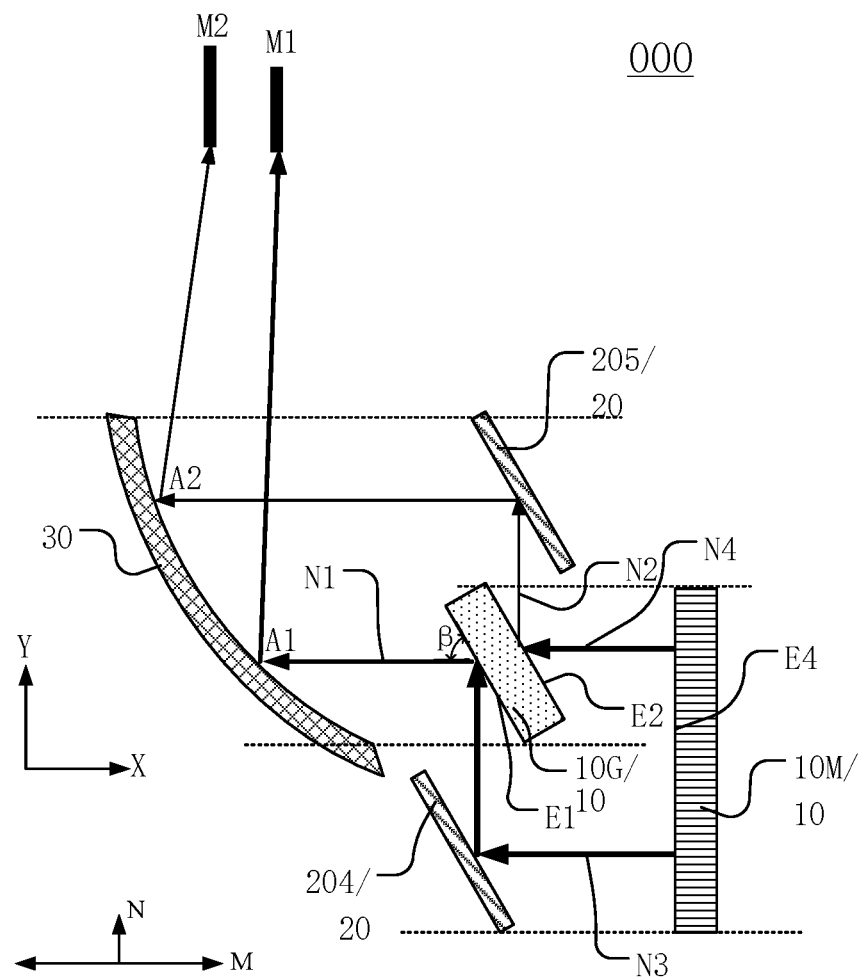
FIG. 20 illustrates a schematic diagram of another exemplary display device consistent with disclosed embodiments of the present disclosure.
Figure 21:
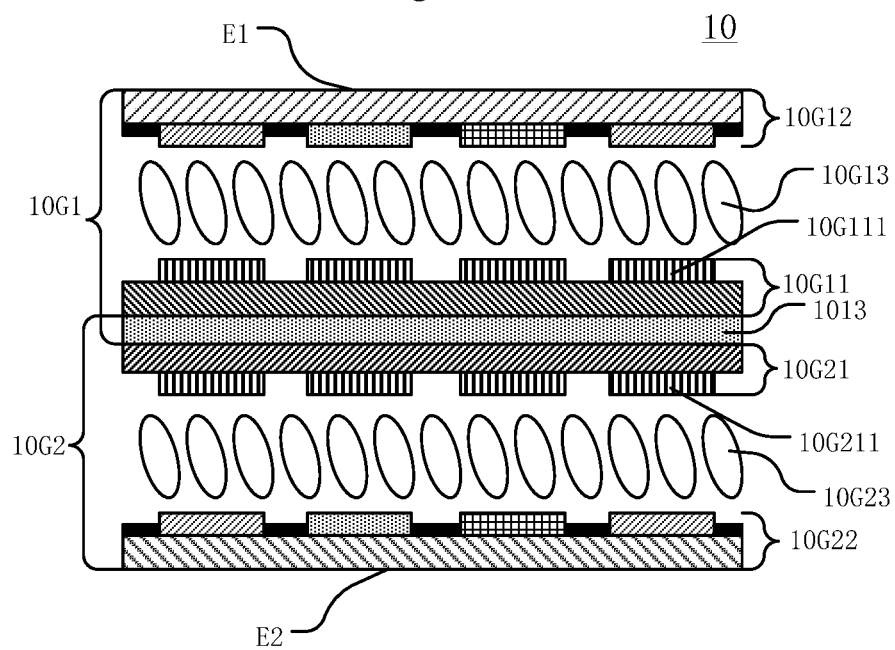
FIG. 21 illustrates a schematic local cross-sectional view of an exemplary double-sided reflective display panel consistent with disclosed embodiments of the present disclosure.
Figure 22:
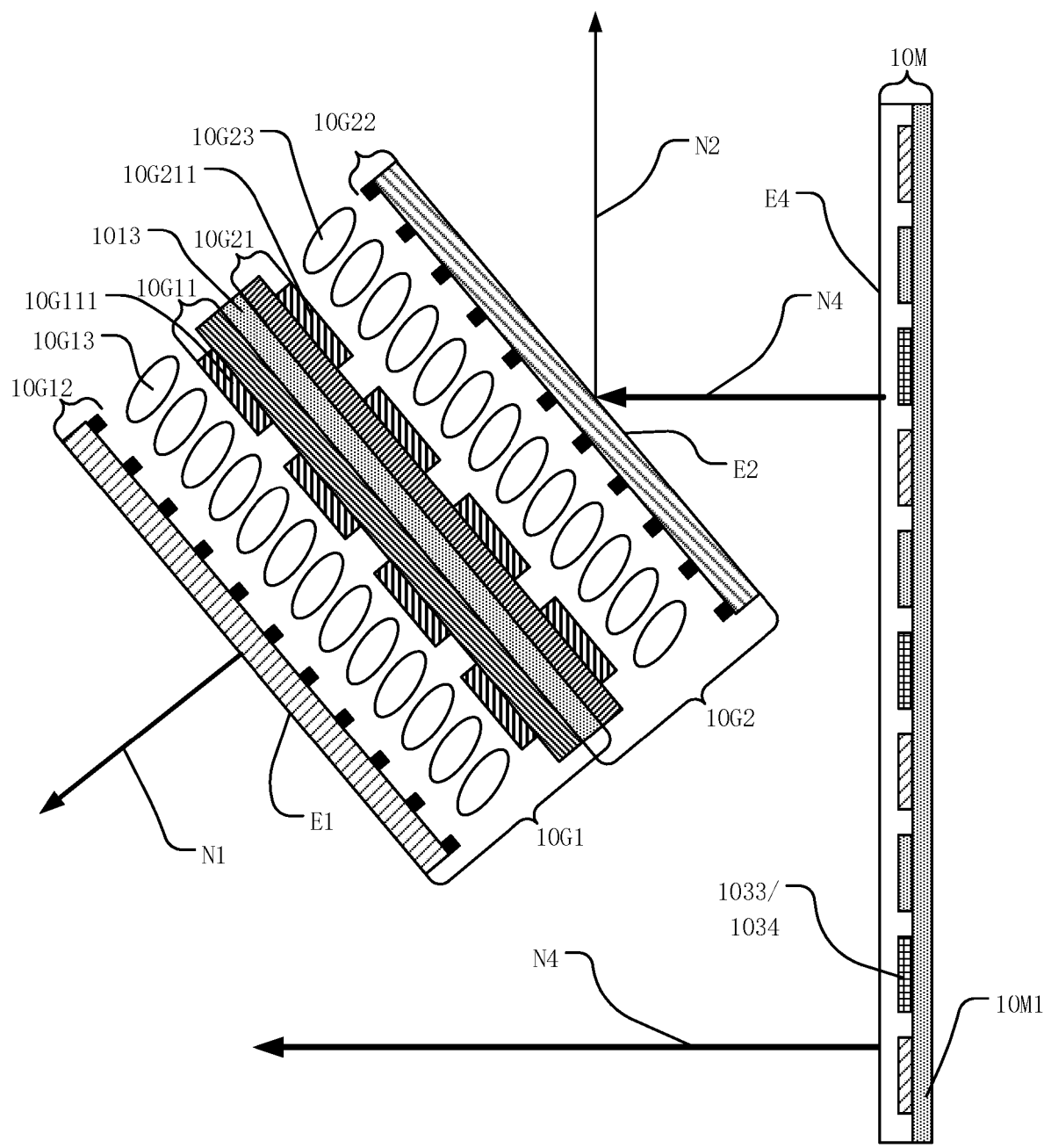
FIG. 22 illustrates a schematic local cross-sectional view of a double-sided reflective display panel and a fourth backlight module in FIG. 20 consistent with disclosed embodiments of the present disclosure.

FIG. 20 illustrates a schematic diagram of another display device consistent with disclosed embodiments of the present disclosure; FIG. 21 illustrates a schematic local cross-sectional view of a double-sided reflective display panel consistent with disclosed embodiments of the present disclosure; and FIG. 22 illustrates a schematic local cross-sectional view of the double-sided reflective display panel and a fourth backlight module in FIG. 20 consistent with disclosed embodiments of the present disclosure. In certain embodiments, referring to FIGS. 20-22, the double-sided display module 10 of the display device 000 may include a double-sided reflective display panel 10G and a fourth backlight module 10M that are independent of each other.

Along the first direction M, the fourth backlight module 10M may be disposed on the side of the double-sided reflective display panel 10G away from the curved mirror 30. The double-sided reflective display panel 10G may include a second reflective liquid crystal display panel 10G1 and a third reflective liquid crystal display panel 10G2 that are laminated to fit each other. The light-exiting surface of the second reflective liquid crystal display panel 10G1 may be the first light-exiting surface E1, and the light-exiting surface of the third reflective liquid crystal display panel 10G2 may be the second light-exiting surface E2. The fourth backlight module 10M may be configured to provide a backlight source for the double-sided reflective display panel 10G. The reflective component 20 may include a fourth plane mirror 204 and a fifth plane mirror 205. A reflective surface of the fourth plane mirror 204 may face the first light-exiting surface E1, and a reflective surface of the fifth plane mirror 205 may face the second light-exiting surface E2.

The first direction M may intersect the plane of the first light-exiting surface E1 at an angle $\beta$. Optionally, the angle $\beta$ may be an acute angle. The first direction M may be perpendicular to a plane of a light-exiting surface E4 of the fourth backlight module 10M. It should be understood that to clearly illustrate the structure in the present disclosure, the light-exiting surface E4 of the fourth backlight module 10M in the Figure may merely take a beam of light as an example, which may not represent all the light emitted from the actual light-exiting surface.

The light N4 emitted from the light-exiting surface E4 of the fourth backlight module 10M may be projected to the fourth plane mirror 204 along the first direction M, and may be projected to the second reflective liquid crystal display panel 10G1 after being reflected by the reflective surface of the fourth plane mirror 204, thereby providing a backlight source for the second reflective liquid crystal display panel 10G1. The second reflective liquid crystal display panel 10G1 may display an image, and the light N1 emitted from the first light-exiting surface E1 may be directly projected to the first position A1 on the curved mirror 30 along the first direction M.

The light N4 emitted from the light-exiting surface E4 of the fourth backlight module 10M may be projected to the third reflective liquid crystal display panel 10G2 along the first direction M, and then may provide a backlight source for the third reflective liquid crystal and the light N2 emitted from the second light-exiting surface E2 may be projected to the reflective surface of the fifth plane mirror 205 and then may be projected to the second position A2 on the curved mirror 30 after being reflected by the fifth plane mirror 205.

Optionally, referring to FIG. 21 and FIG. 22, the double-sided reflective display panel 10G may include the second reflective liquid crystal display panel 10G1 and the third reflective liquid crystal display panel 10G2 that are laminated to fit each other. The light-exiting surface of the second reflective liquid crystal display panel 10G1 may be the first light-exiting surface E1, and the light-exiting surface of the third reflective liquid crystal display panel 10G2 may be the second light-exiting surface E2. The second reflective liquid crystal display panel 10G1 may include a substrate base 1013, a sixth array substrate 10G11, a sixth liquid crystal layer 10G13, and a sixth color filter substrate 10G12 that are sequentially disposed. The sixth array substrate 10G11 may include a second reflective layer 10G111. The third reflective liquid crystal display panel 10G2 may include the substrate base 1013, a seventh array substrate 10G21, a seventh liquid crystal layer 10G23, and a seventh color filter substrate 10G22 that are sequentially disposed. The seventh array substrate 10G21 may include a third reflective layer 10G211.

Optionally, the substrate base 1013 may be shared by the second reflective liquid crystal display panel 10G1 and the third reflective liquid crystal display panel 10G2, which may facilitate to thin the display screen. The second reflective liquid crystal display panel 10G1 and the third reflective liquid crystal display panel 10G2 in the present disclosure may have the function of a reflective liquid crystal display panel, and the ambient light and the fourth backlight module 10M may jointly provide a backlight source for the double-sided reflective display panel 10G, which may facilitate to reduce display power consumption.

The present disclosure may explain that the reflective component 20 may include the fourth plane mirror 204 and the fifth plane mirror 205. Along the second direction N, the fourth plane mirror 204 and the fifth plane mirror 205 may be disposed on both sides of the double-sided reflective display panel 10G, respectively. The reflective surface of the fourth plane mirror 204 may face the first light-exiting surface E1, and the reflective surface of the fifth plane mirror 205 may face the second light-exiting surface E2. Optionally, the reflective surface of the fourth plane mirror 204 may be parallel to the plane of the first light-exiting surface E1, and the reflective surface of the fifth plane mirror 205 may be parallel to the plane of the second light-exiting surface E2, which may facilitate to reduce the space occupied by the device.

The first direction M may intersect the plane of the first light-exiting surface E1 of the double-sided reflective display panel 10G at an angle β. Optionally, the angle θ may be an acute angle. The first direction M may be perpendicular to the plane of the light-exiting surface E4 of the fourth backlight module 10M. Therefore, the light N4 emitted from the light-exiting surface E4 of the fourth backlight module 10M may be projected to the double-sided reflective display panel 10G as much as possible, which may facilitate to improve the utilization of backlight light, and may improve the display image quality of the double-sided reflective display panel 10G.

During the use of the display device 000 in the present disclosure, the light N4 emitted from the light-exiting surface E4 of the fourth backlight module 10M may be projected to the fourth plane mirror 204 along the first direction M, and may be projected to the second reflective liquid crystal display panel 10G1 after being reflected by the fourth plane mirror 204, thereby providing a backlight source for the second reflective liquid crystal display panel 10G1. The second reflective liquid crystal display panel 10G1 may display an image, and the light N1 emitted from the first light-exiting surface E1 may be directly projected to the first position A1 on the curved mirror 30 along the first direction M. The light N4 emitted from the light-exiting surface E4 of the fourth backlight module 10M may be projected to the third reflective liquid crystal display panel 10G2 along the first direction M, and then may provide a backlight source for the third reflective liquid crystal display panel 10G2. The third reflective liquid crystal display panel 10G2 may display an image, and the light N2 emitted from the second light-exiting surface E2 may be projected to the reflective surface of the fifth plane mirror 205, and then may be projected to the second position A2 on the curved mirror 30 after being reflected by the fifth plane mirror 205. Ultimately, the first virtual image M1 and the second virtual image M2 may be formed through the curved reflection of the curved mirror 30.

Optionally, referring to FIG. 22, the fourth backlight module 10M may be a direct back-lit module, and may include a plurality of mini light-emitting diodes 1033 arranged in an array or a plurality of micro light-emitting diodes 1034 arranged in an array. The fourth backlight module 10M may include a driving base 10M1 and mini light-emitting diodes 1033 or micro light-emitting diodes 1034 disposed on the side of the driving base 10M1 close to the double-sided reflective display panel 10G. In other words, a plurality of mini light-emitting diodes 1033 or micro light-emitting diodes 1034 electrically connected to the driving base 10M1 may be disposed on the side of the driving base 10M1 close to the double-sided reflective display panel 10G. The mini light-emitting diodes 1033 or the micro light-emitting diodes 1034 of the fourth backlight module 10M may include at least three colors, and then the sixth color filter substrate 10G12 of the second reflective liquid crystal display panel 10G1 and the seventh color filter substrate 10G22 of the third reflective liquid crystal display panel 10G2 may not include the color resist layer. Therefore, the thickness of the double-sided reflective display panel 10G may be further reduced, and the volume of the double-sided display module 10 may be reduced.

Optionally, the lower edge of the double-sided display module 10 may be coplanar with the lower edge of the curved mirror 30 (as shown by the dotted line in FIG. 20), or the lower edge of the double-sided display module 10 may be higher than the lower edge of the curved mirror 30, such that the light emitted from the first light-exiting surface E1 of the double-sided display module 10 may be projected to the curved mirror 30 as much as possible. The upper edge of the fourth backlight module 10M may be coplanar with the upper edge of the double-sided display module 10, and the lower edge of the fourth backlight module 10M may be coplanar with the lower edge of the fourth plane mirror 204 (as shown by the dashed line in FIG. 20). Therefore, the light emitted from the light-exiting surface E4 of the fourth backlight module 10M may be projected to the second light-exiting surface E2 of the double-sided display module 10 and the fourth plane mirror 204 for reflection as much as possible. The lower edge of the fifth plane mirror 205 may be coplanar with or higher than the upper edge of the double-sided display module 10 and the upper edge of the fourth backlight module 10M, which may prevent the fifth plane mirror 205 from shielding the light. The upper edge of the fifth plane mirror 205 may be coplanar with the upper edge of the curved mirror 30 (as shown by the dotted line in FIG. 20), or the upper edge of the fifth plane mirror 205 may be lower than the upper edge of the curved mirror 30. Therefore, the light emitted from the second light-exiting surface E2 of the double-sided display module 10 may be projected to the curved mirror 30 as much as possible after being reflected by the fifth plane mirror 205, which may avoid light loss and improve light utilization.

Figure 23:
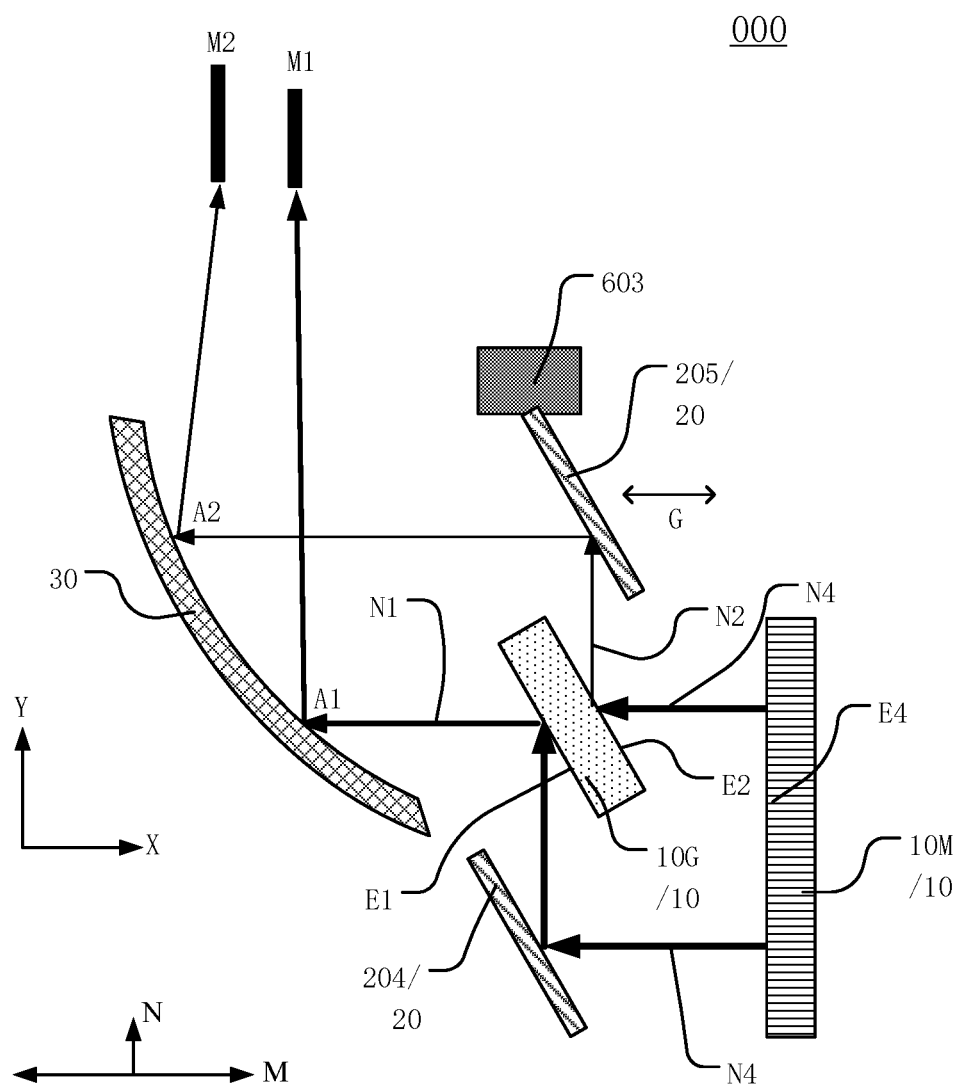
FIG. 23 illustrates a schematic diagram of another exemplary display device consistent with disclosed embodiments of the present disclosure.

FIG. 23 illustrates a schematic diagram of another display device consistent with disclosed embodiments of the present disclosure. In certain embodiments, referring to FIG. 23, the fifth plane mirror 205 may be connected with a third motor 603, and the third motor 603 may control the fifth plane mirror 205 to move in the first direction M (moving towards or away from the double-sided reflective display panel 10G as shown in the Figure).

The present disclosure may explain that the fifth plane mirror 205 may be connected with the third motor 603, and the third motor 603 may control the fifth plane mirror 205 to move in the first direction M (as shown in FIG. 23).

Referring to FIG. 23, the fifth plane mirror 205 may be connected with the third motor 603, and the third motor 603 may control the fifth plane mirror 205 to move along the first direction M, and the movement direction may be shown by the arrow G in FIG. 23. The fifth plane mirror 205 may move under the control of the third motor 603, thereby controlling the imaging distances of the first virtual image M1 and the second virtual image M2. Optionally, if the display device 000 in the present disclosure is applied to a vehicle head-up display, according to the height difference and the sitting habits of the observer in the vehicle, the third motor 603 may drive the fifth plane mirror 205 to move back and forth in the moving direction G along the first direction M, to adjust the different imaging distances of the first virtual image M1 and the second virtual image M2. Therefore, the requirements of different observers may be satisfied, and adjustability may be strong, which may facilitate to improve user experience satisfaction.

When the light forming the first virtual image M1 is projected on the curved mirror 30, the total object distance u1 may be the distance from the first light-exiting surface E1 to the curved mirror 30. When the light forming the second virtual image M2 is projected on the curved mirror 30, the total object distance u2 may be the sum of the distance from the second light-exiting surface E2 to the fifth plane mirror 205 and the distance from the fifth plane mirror 205 to the curved mirror 30, where u2>u1.

For the same curved mirror 30, when the object distance is less than a focal length, the larger the object distance, the larger the imaging distance. A focal length of the curved mirror with a curved radius of R may be approximately R/2, and in the present disclosure, the object distance may be less than the focal length. Therefore, the second virtual image M2 may be farther from the front windshield 40, and the first virtual image M1 may be closer to the front windshield 40, which may not be illustrated in FIG. 23, and may be understood by referring to the position of the front windshield in FIG. 2.

When the third motor 603 controls the fifth plane mirror 205 to approach the curved mirror 30, i.e., the direction close to the double-sided reflective display panel 10G, which may be understood as the direction towards left in FIG. 23, the object distance u2 may decrease, the imaging distance of the second virtual image M2 may decrease accordingly, the object distance u1 may remain unchanged, and the imaging distance of the first virtual image M1 may remain unchanged. In view of this, the distance between the first virtual image M1 and the second virtual image M2 may decrease as the imaging distance of the second virtual image M2 decreases, and, thus, the imaging distance may be adjusted through the third motor 603.

It should be noted that the model and operating voltage of the third motor 603 may not be specifically limited by the present disclosure. During specific implementation, the third model 603 may be selectively set according to the volume size and operating state, as long as the third motor 603 is capable of driving the fifth plane mirror 205 to move.

Figure 24:
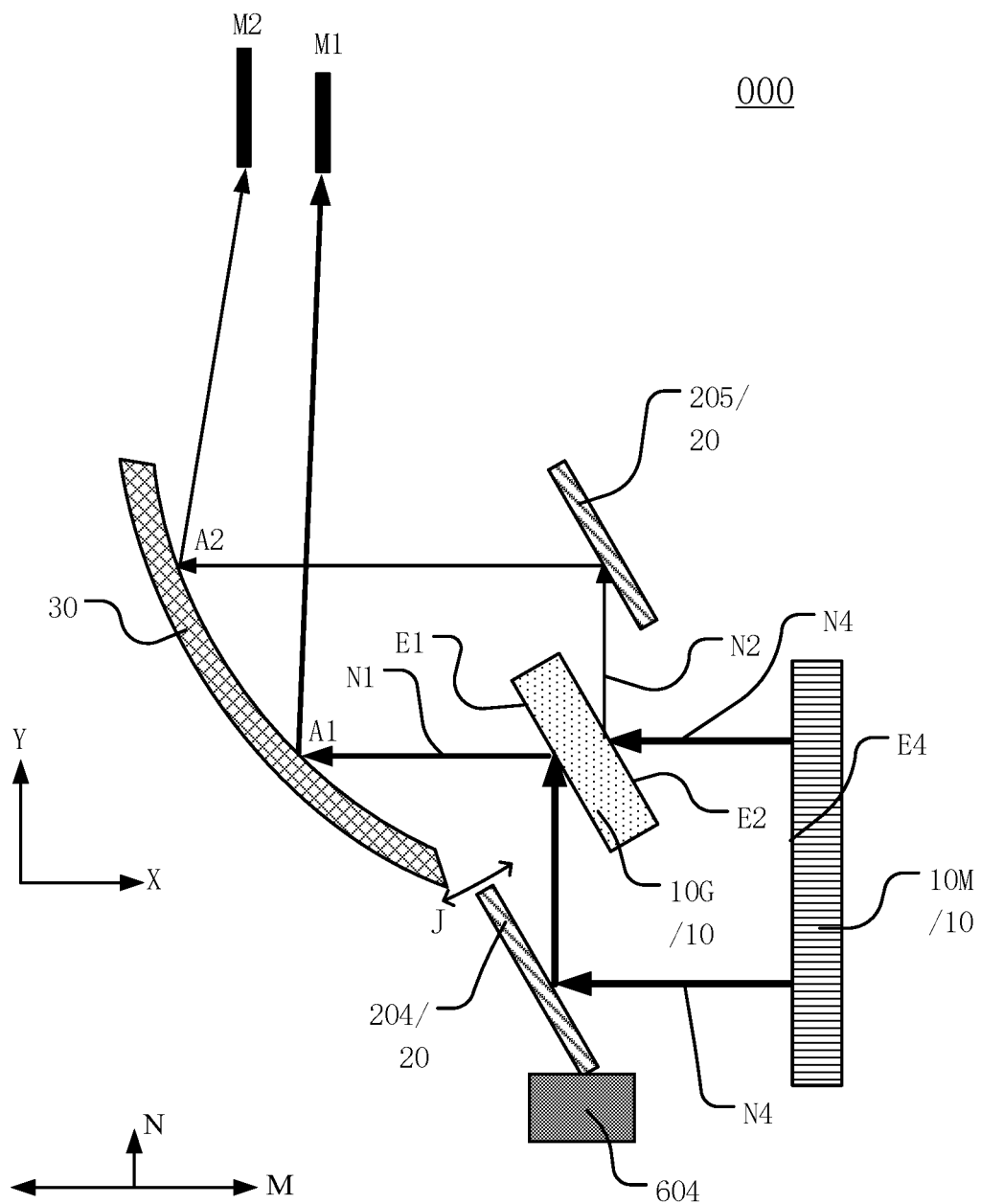
FIG. 24 illustrates a schematic diagram of another exemplary display device consistent with disclosed embodiments of the present disclosure.
Figure 25:
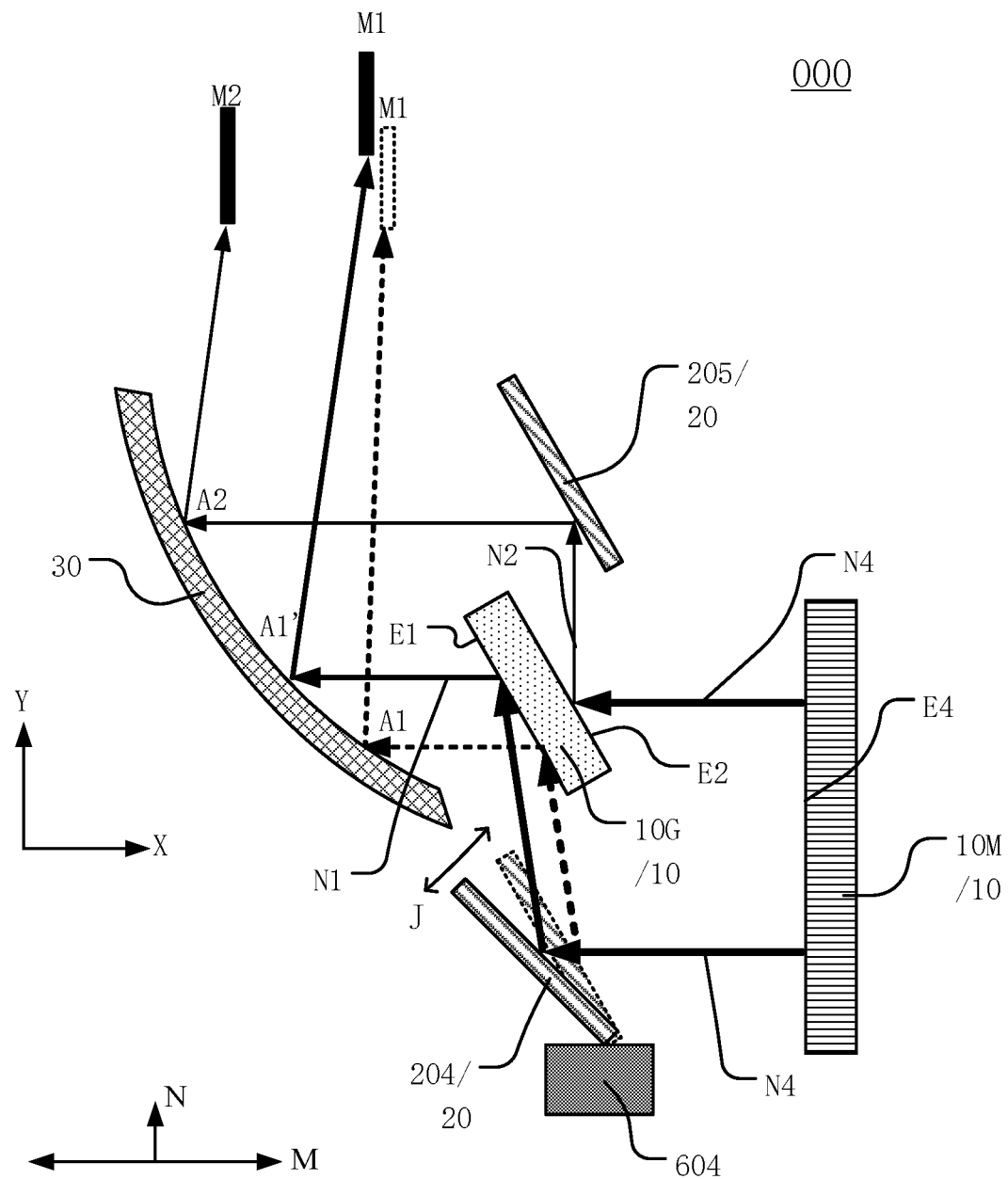
FIG. 25 illustrates a schematic diagram of another exemplary display device consistent with disclosed embodiments of the present disclosure.
Figure 26:
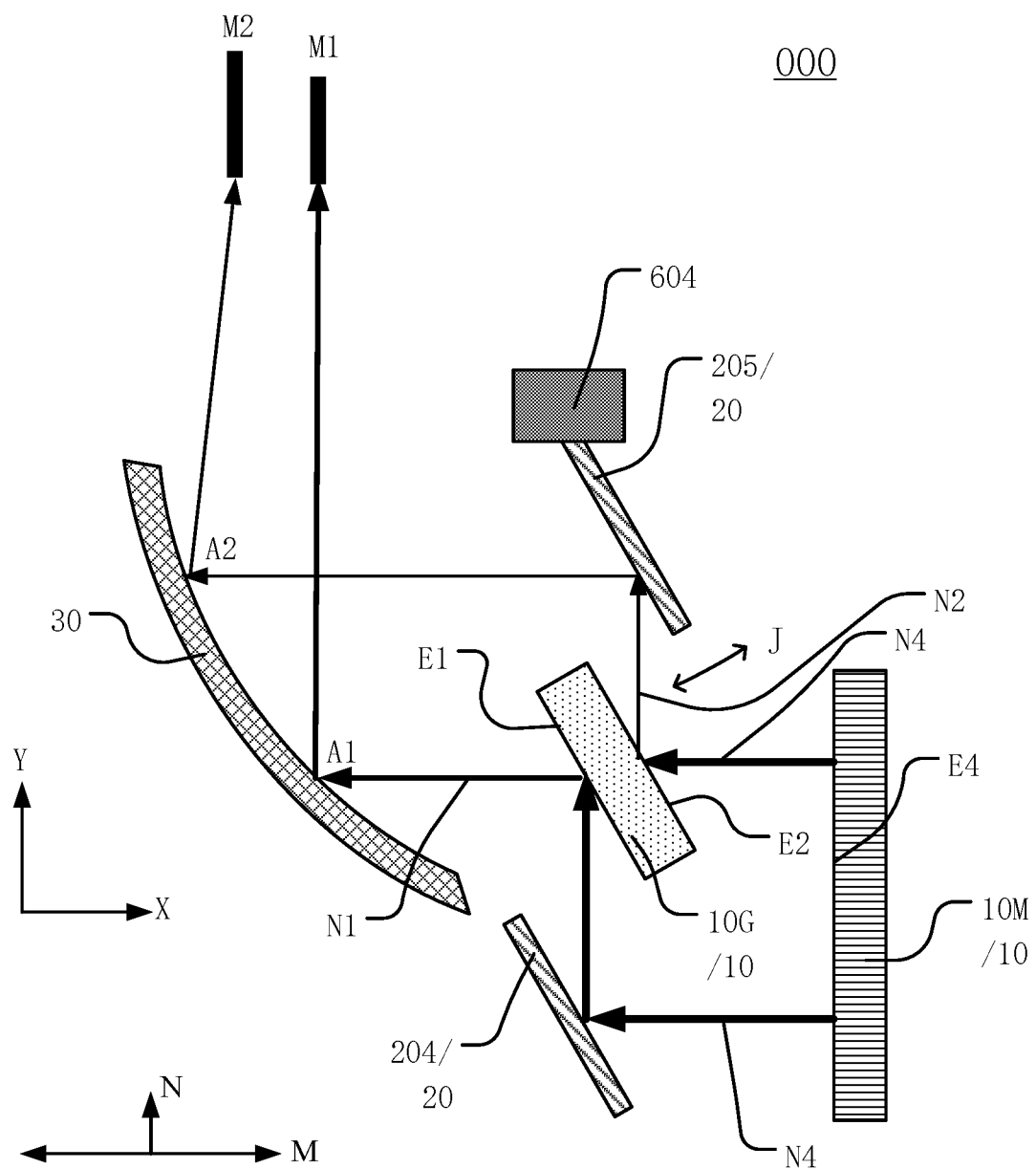
FIG. 26 illustrates a schematic diagram of another exemplary display device consistent with disclosed embodiments of the present disclosure.
Figure 27:
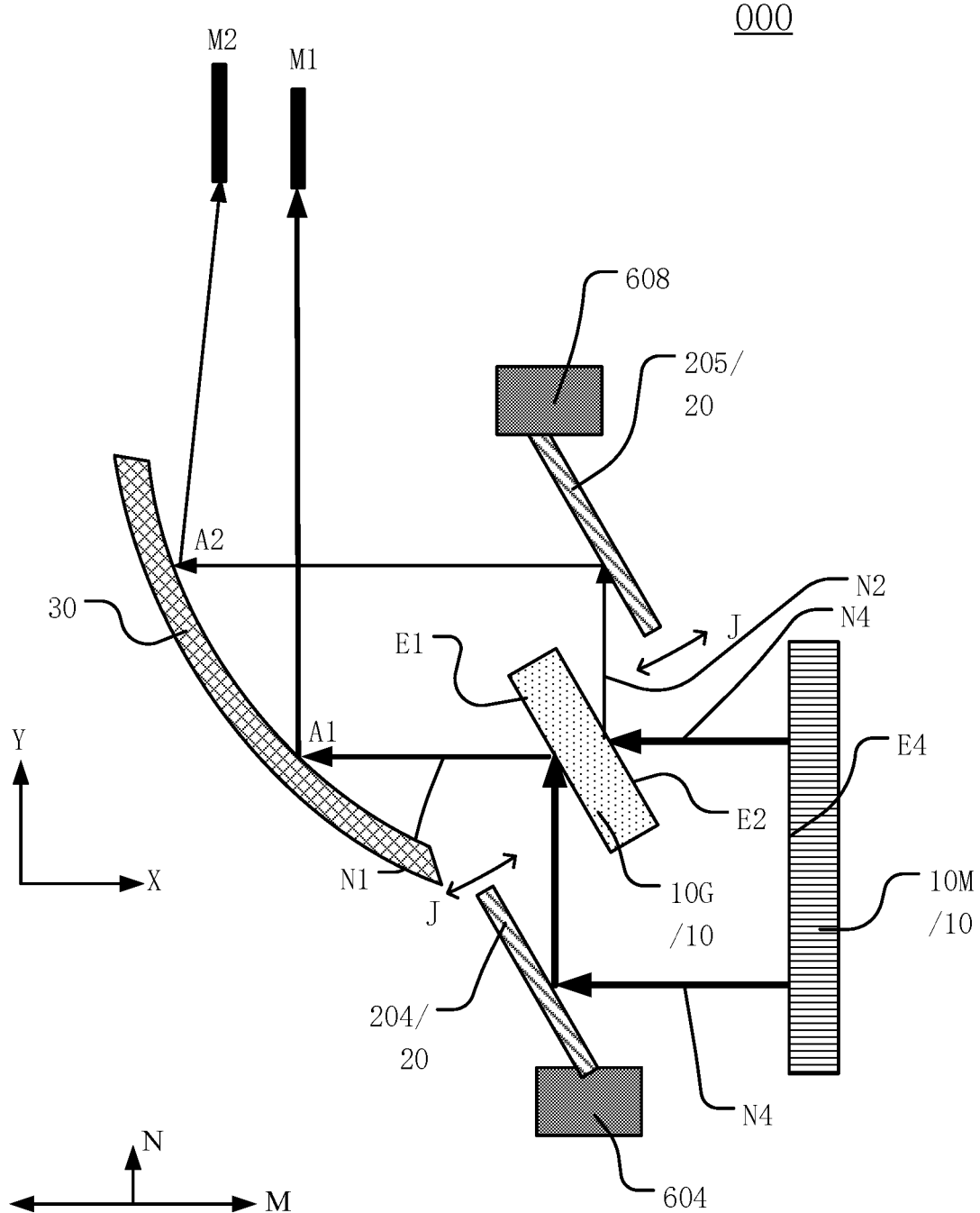
FIG. 27 illustrates a schematic diagram of another exemplary display device consistent with disclosed embodiments of the present disclosure.

FIG. 24 illustrates a schematic diagram of another display device consistent with disclosed embodiments of the present disclosure; FIG. 25 illustrates a schematic diagram of another display device consistent with disclosed embodiments of the present disclosure; FIG. 26 illustrates a schematic diagram of another display device consistent with disclosed embodiments of the present disclosure; and FIG. 27 illustrates a schematic diagram of another display device consistent with disclosed embodiments of the present disclosure. In certain embodiments, referring to FIGS. 24-27, the fourth plane mirror 204 and/or the fifth plane mirror 205 may be connected with a fourth motor 604. The fourth motor 604 may control the fourth plane mirror 204 and/or the fifth plane mirror 205 to rotate.

The present disclosure may explain that the fourth plane mirror 204 may be connected with the fourth motor 604, and the fourth motor 604 may control the fourth plane mirror 204 to rotate (as shown in FIG. 24). Alternatively, the fifth plane mirror 205 may be connected with the fourth motor 604, and the fourth motor 604 may control the fifth plane mirror 205 to rotate (as shown in FIG. 26). In certain embodiments, the fourth plane mirror 204 may be connected with the fourth motor 604, and the fourth motor 604 may control the fourth plane mirror 204 to rotate; and the fifth plane mirror 205 may be connected with an eighth motor 608, and the eighth motor 608 may control the fifth plane mirror 205 to rotate (as shown in FIG. 27).

Referring to FIG. 24, the fourth plane mirror 204 may be connected with the fourth motor 604, and the fourth motor 604 may control the fourth plane mirror 204 to rotate, where the rotation direction may be shown as an arrow J in FIG. 24. Therefore, through the control of the fourth motor 604, the fourth plane mirror 204 may be rotated to change the path of the light emitted from the fourth backlight module 10M and reflected by the fourth plane mirror 204, which may control the imaging height of the first virtual image M1. Optionally, when the display device 000 in the present disclosure is applied to a vehicle head-up display, according to the height difference and sitting habits of the observer in the vehicle, under the control of the fourth motor 604, the fourth plane mirror 204 may be rotated to allow the observer's eye to be level with the first virtual image M1 even when being at a different position, which may improve the use experience satisfaction.

Referring to FIG. 25, after the fourth plane mirror 204 is rotated under the control of the fourth motor 604, the fourth plane mirror 204 may be located at a position shown in FIG. 25. The dotted line in FIG. 25 may indicate the position of the fourth plane mirror 204 before being rotated and the original optical path direction. In view of this, after the light N4 emitted from the fourth backlight module 10M is reflected by the fourth plane mirror 204 and enters the second reflective liquid crystal display panel 10G1, the first light-exiting surface E1 of the second reflective liquid crystal display panel 10G1 may display an image. The light N1 emitted from the first light-exiting surface E1 may be directly projected to a first position A1' on the curved mirror 30 along the first direction M, and the first position A1' may be above the first position A1 in FIG. 24. Thus, the position of the first virtual image M1 formed by the light N1 after being reflected by the curved mirror 30 may raise, such that the imaging height of the formed first virtual image M1 may increase.

Referring to FIG. 26, to adjust the imaging height, the fifth plane mirror 205 may be connected with the fourth motor 604. The fourth motor 604 may control the fifth plane mirror 205 to rotate, thereby changing the imaging height of the second virtual image M2. The principle of controlling the rotation of the fifth plane mirror 205 through the fourth motor 604 may be similar to the principle of controlling the rotation of the fourth plane mirror 204 through the fourth motor 604, which may not be repeated herein.

Referring to FIG. 27, to effectively adjust the imaging height, the fourth plane mirror 204 may be connected with the fourth motor 604, and the fifth plane mirror 205 may be connected with the eighth motor 608. The joint rotation of the fourth plane mirror 204 and the fifth plane mirror 205 may facilitate to substantially flexibly adjust the imaging height.

It should be noted that the models and operating voltages of the fourth motor 604 and the eighth motor 608 may not be specifically limited by the present disclosure. During specific implementation, the fourth motor 604 and the eighth motor 608 may be selectively set according to the volume size and operating state, as long as the fourth motor 604 is capable of driving the fourth plane mirror 204 to rotate, and the eighth motor 608 is capable of driving the fifth plane mirror 205 to rotate.

Figure 28:
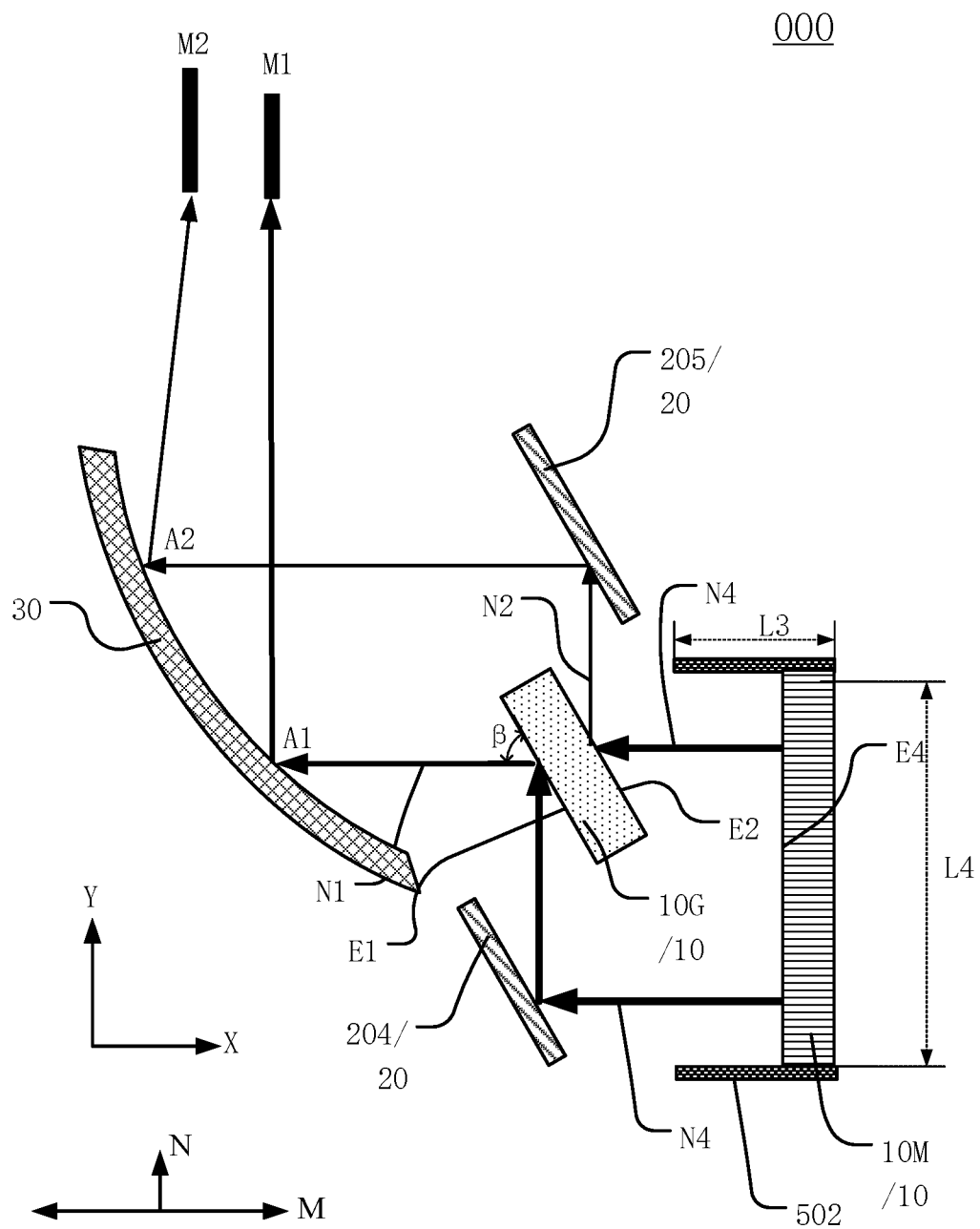
FIG. 28 illustrates a schematic diagram of another exemplary display device consistent with disclosed embodiments of the present disclosure.

FIG. 28 illustrates a schematic diagram of another display device consistent with disclosed embodiments of the present disclosure. In certain embodiments, referring to FIG. 28, along the second direction N, second light-shielding plates 502 may be disposed on both sides of the fourth backlight module 10M, respectively. Along the first direction M, a length of the second light-shielding plate 502 may be L3. Along the second direction N, a length of the fourth backlight module 10M may be L4, where L3=B×L4, and a value of B may be in a range of approximately 5%-20%.

The present disclosure may explain that the second light-shielding plates 502 may be disposed on both sides of the fourth backlight module 10M, respectively (as shown in FIG. 28). A quantity of the second light-shielding plates 502 may be two, and the two second light-shielding plates 502 may be disposed on both sides of the fourth backlight module 10M in the second direction N, respectively. The two second light-shielding plates 502 may be configured to prevent the light emitted from the fourth backlight module 10M from being diverged.

Optionally, because the light-exiting surface E4 of the fourth backlight module 10M faces the double-sided display module 10, the second light-shielding plates 502 may be disposed on both sides of the fourth backlight module 10M and as close as possible to the double-sided display module 10. In other words, along the first direction M, the end of the second light-shielding plate 502 away from the double-sided display module 10 may be coplanar with the side of the fourth backlight module 10M away from the double-sided display module 10, such that the light emitted from the light-exiting surface E4 of the fourth backlight module 10M may be effectively shielded and may be prevented from being diverged. In the present disclosure, the second light-shielding plates 502 may prevent the light emitted from the light-exiting surface E4 of the fourth backlight module 10M from being too divergent, may prevent the light emitted from the double-sided display module 10 from being diverged to the outside of the display device and from affecting the light output rate of the fourth backlight module 10M, which may cause light loss and affect the imaging quality.

Optionally, if the display device 000 in the present disclosure is applied to a vehicle head-up display, the light emitted to the outside of the display device 000 may be likely to enter the field of view of the observer after being reflected by some reflective elements in the vehicle, which may cause stray light and affect driving safety. Therefore, in the present disclosure, through fixedly disposing the second light-shielding plates 502 on both sides of the fourth backlight module 10M, the light emitted from the light-exiting surface E4 of the fourth backlight module 10M may be prevented from being diverged to generate stray light.

Optionally, along the first direction M, the second light-shielding plate 502 may have the length of L3, and along the second direction N, the fourth backlight module 10M may have the length of L4, where L4=B×L3, and the value of B may be in a range of approximately 5%-20%. In one embodiment, B may be 10%. In other words, the length L3 of the second light-shielding plate 502 in the first direction M may be B times of the length L4 of the fourth backlight module 10M in the second direction N, where the value of B may be in a range of approximately 5%-20%. In one embodiment, B may be 10%. Therefore, while ensuring the shading effect, the length L3 of the second light-shielding plate 502 in the first direction M may be prevented from being too large to affect the volume of the device, which may facilitate to reduce the volume of the device.

Figure 29:
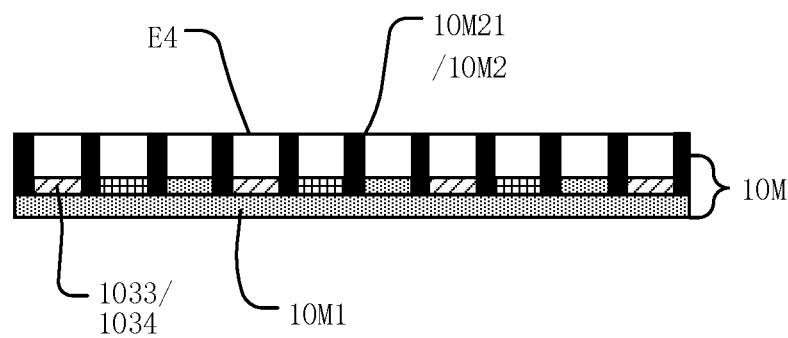
FIG. 29 illustrates a schematic local cross-sectional view of an exemplary fourth backlight module consistent with disclosed embodiments of the present disclosure.

FIG. 29 illustrates a schematic local cross-sectional view of a fourth backlight module consistent with disclosed embodiments of the present disclosure. In certain embodiments, referring to FIGS. 16-29, the fourth backlight module 10M may be a direct back-lit module. The fourth backlight module 10M may include a collimation layer 10M2. Optionally, the fourth backlight module 10M may include a driving base 10M1, and mini light-emitting diodes 1033 or micro light-emitting diodes 1034 disposed on a side of the driving base 10M1 close to the double-sided reflective display panel 10G. In other words, a plurality of mini light-emitting diodes 1033 or micro light-emitting diodes 1034 that are electrically connected to the driving base 10M1 may be disposed on the side of the driving base 10M1 close to the double-sided reflective display panel 10G. The collimation layer 10M2 may be disposed on the side of the driving base 10M1 close to the double-sided reflective display panel 10G.

The present disclosure may explain that the collimation layer 10M2 may be disposed on the side of the fourth backlight module 10M close to the light-exiting surface E4. The collimation layer 10M2 may include a plurality of shading curtains 10M21, and the shading curtain 10M21 may be made of a same material as the black matrix layer in the double-sided reflective display panel 10G. The space formed between two adjacent shading curtains 10M21 may at least one-to-one correspond to a mini light-emitting diode 1033 or a micro light-emitting diode 1034 over the driving base 10M1. An orthographic projection of each shading curtain 10M21 on the driving base 10M1 may be located between two adjacent mini light-emitting diodes 1033 or micro light-emitting diodes 1034, such that the mini light-emitting diode 1033 or the micro light-emitting diode 1034 of the fourth backlight module 10M may emit light through the space formed by the two adjacent shading curtains 10M21. In other words, the light emitted from the light-exiting surface E4 of the fourth backlight module 10M may emit along a direction perpendicular to the light-exiting surface E4 as much as possible, such that the light intensity distribution of the fourth backlight module 10M may be substantially concentrated, which may improve the light utilization rate, and may facilitate to improve the display effect of the double-sided reflective display panel 10G.

Figure 30:
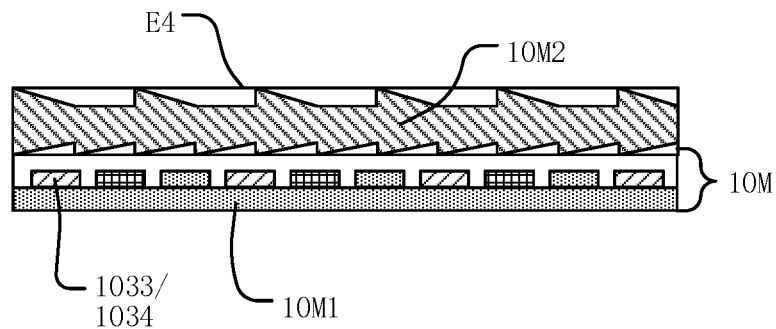
FIG. 30 illustrates a schematic local cross-sectional view of another exemplary fourth backlight module consistent with disclosed embodiments of the present disclosure.

FIG. 30 illustrates a schematic local cross-sectional view of another fourth backlight module consistent with disclosed embodiments of the present disclosure. Optionally, referring to FIG. 30, the collimation layer 10M2 may have a film layer structure with microstructure such as edges and corners. Further optionally, the collimation layer 10M2 may be formed by laminating optical films with different refractive indexes. A surface of the collimation layer 10M2 away from the driving base 10M1 and/or a surface of the collimation layer 10M2 close to the driving base 10M1 may have a structure of edges and corners (as shown in FIG. 30). Therefore, the light emitted from the mini light-emitting diode 1033 or micro light-emitting diode 1034 on the driving base 10M1 may be refracted at a certain angle. By selectively setting different angles of the microstructures such as edges and corners, the light ultimately emitted from the collimation layer 10M2 may emit in the direction perpendicular to the light-exiting surface E4 as much as possible. Therefore, the light intensity distribution of the fourth backlight module 10M may be substantially concentrated, which may improve the light utilization rate.

It should be noted that FIG. 30 merely illustrates a kind of the shape of the collimation layer 10M2 with microstructures such as edges and corners, which may not be limited by the present disclosure. The microstructures on the surface of the collimation layer 10M2 may have any other shape, as long as after passing through the collimation layer 10M2, the light emitted from the mini light-emitting diode 1033 or the micro light-emitting diode 1034 may emit in the direction perpendicular to the light-exiting surface E4 as much as possible through the refraction relationship, such that the light intensity distribution of the fourth backlight module 10M may be substantially concentrated, which may not be specifically limited by the present disclosure.

Figure 31:
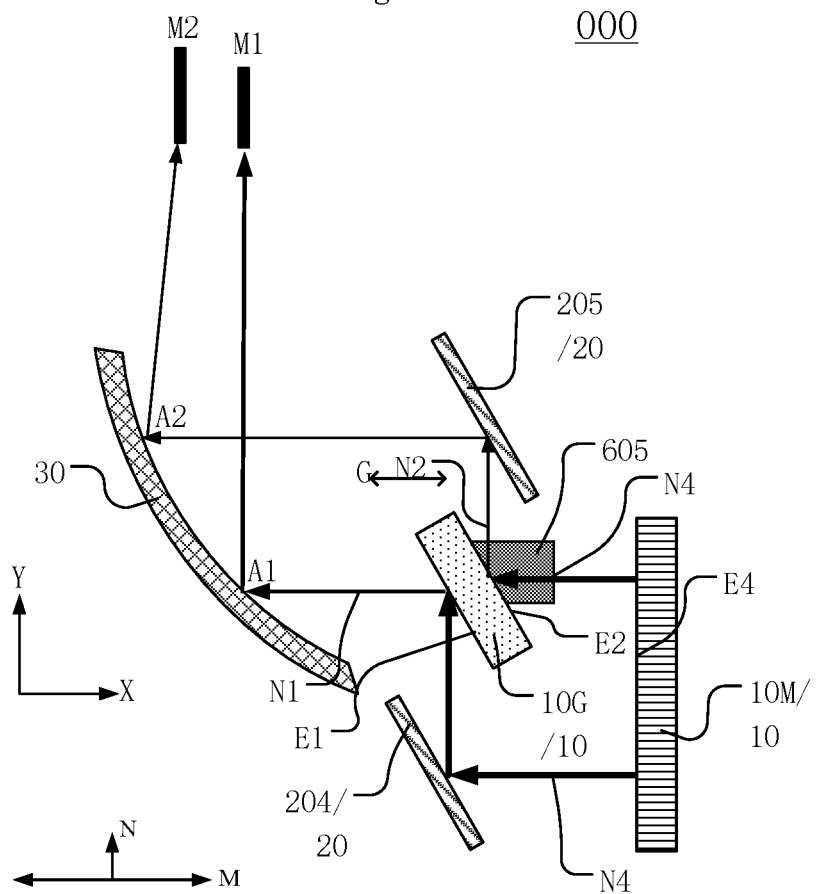
FIG. 31 illustrates a schematic diagram of another exemplary display device consistent with disclosed embodiments of the present disclosure.

FIG. 31 illustrates a schematic diagram of another display device consistent with disclosed embodiments of the present disclosure. In certain embodiments, referring to FIG. 31, the double-sided reflective display panel 10G may be connected with a fifth motor 605. The fifth motor 605 may control the double-sided reflective display panel 10G to move in the first direction M. As shown in FIG. 31, the double-sided reflective display panel 10G may be connected with the fifth motor 605, and the fifth motor 605 may control the double-sided reflective display panel 10G to move in the first direction M (moving towards a direction approaching or away from the fourth plane mirror 204, as shown in the Figure), and the moving direction may be shown as the arrow G in FIG. 31.

When the light forming the first virtual image M1 is projected to the curved mirror 30, the total object distance u1 may be the distance from the first light-exiting surface E1 to the curved mirror 30. When the light forming the second virtual image M2 is projected to the curved mirror 30, the total object distance u2 may be a sum of the distance from the second light-exiting surface E2 to the fourth plane mirror 204 and the distance from the fourth plane mirror 204 to the curved mirror 30, where u2>u1.

For the same curved mirror 30, when the object distance is less than a focal length, the larger the object distance, the larger the imaging distance. A focal length of the curved mirror with a curved radius of R may be approximately R/2, and in the present disclosure, the object distance may be less than the focal length. Therefore, the second virtual image M2 may be farther from the front windshield 40, and the first virtual image M1 may be closer to the front windshield 40, which may not be illustrated in FIG. 31, and may be understood by referring to the position of the front windshield in FIG. 2.

When the double-sided reflective display panel 10G moves towards the fourth plane mirror 204 (which may be understood as the direction towards left in FIG. 31) under the control of the fifth motor 605, the object distance u1 may decrease, the imaging distance of the first virtual image M1 may also decrease, the object distance u2 may remain unchanged or may increase, and the imaging distance of the second virtual image M2 may also remain unchanged or may increase. In view of this, the distance between the first virtual image M1 and the second virtual image M2 may increase as the imaging distance of the first virtual image M1 decreases. Therefore, the imaging distances of the first virtual image M1 and the second virtual image M2 may be jointly controlled by merely moving the double-sided reflective display panel 10G under the control of the fifth motor 605.

Optionally, if the display device 000 in the present disclosure is applied to a vehicle head-up display, according to the height difference and the sitting habits of the observer in the vehicle, the fifth motor 605 may drive the double-sided reflective display panel 10G to move back and forth in the moving direction G along the first direction M, to adjust the different imaging distances of the first virtual image M1 and the second virtual image M2. Therefore, the requirements of different observers may be satisfied, and adjustability may be strong, which may facilitate to improve user experience satisfaction.

Figure 32:
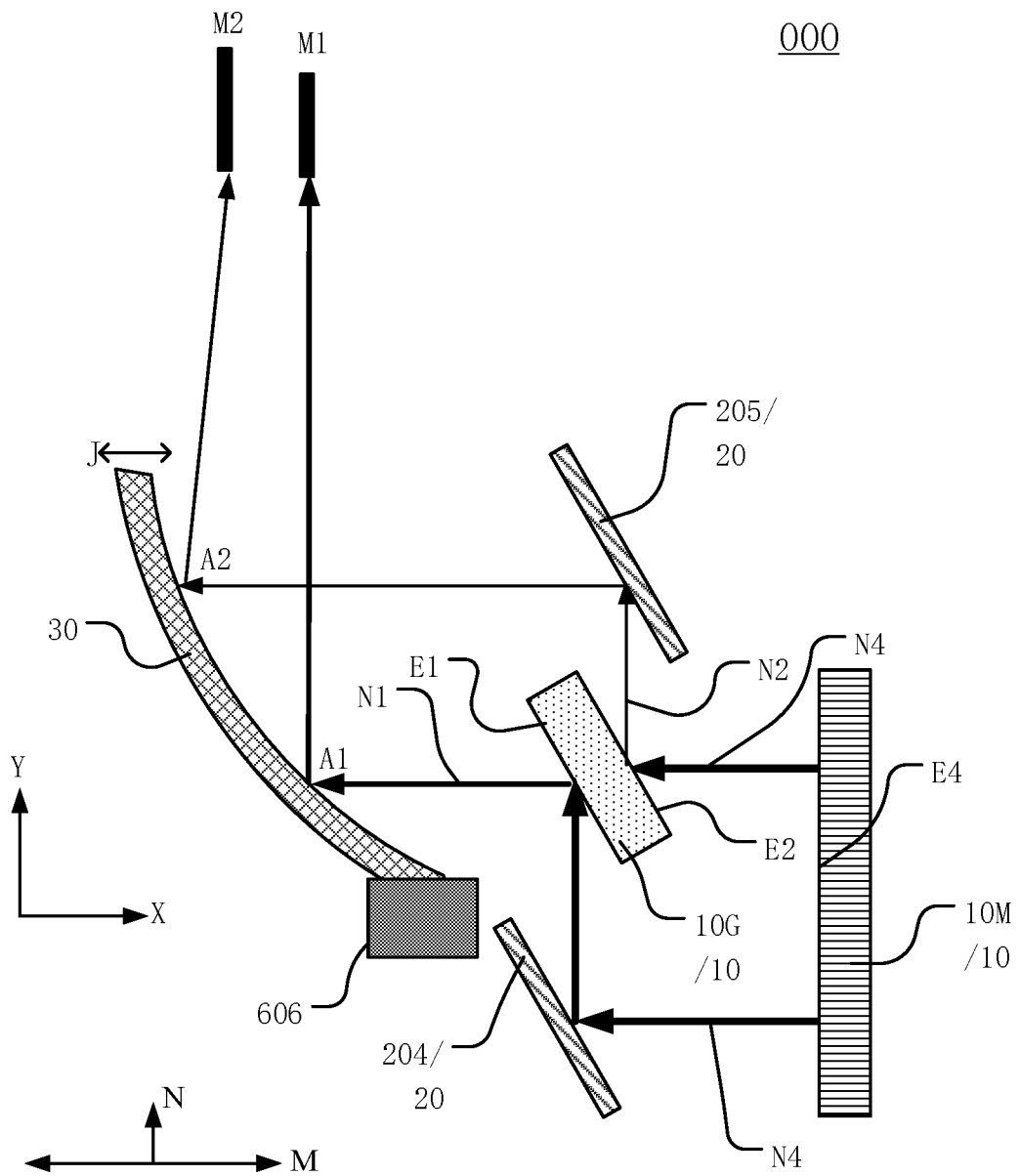
FIG. 32 illustrates a schematic diagram of another exemplary display device consistent with disclosed embodiments of the present disclosure.
Figure 33:
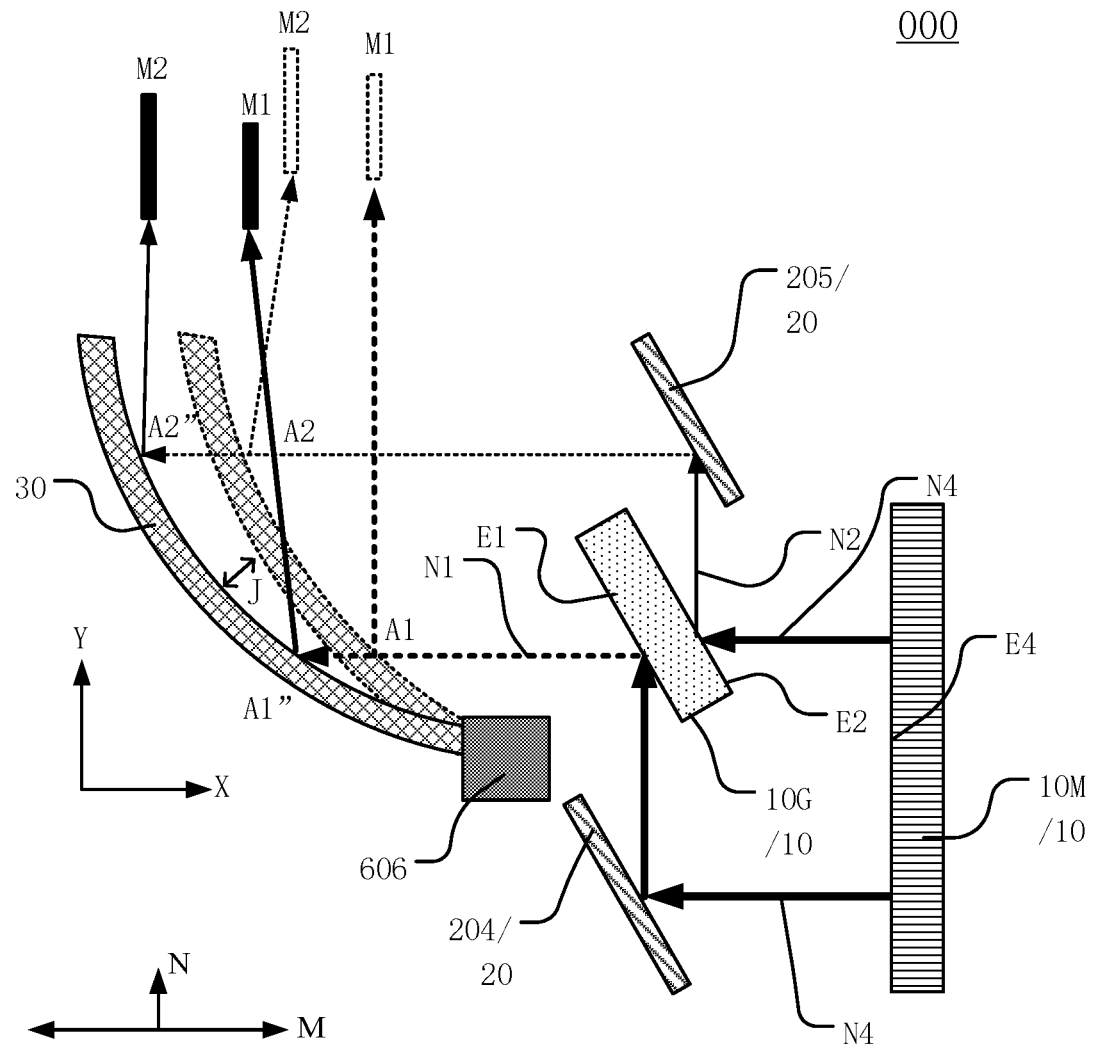
FIG. 33 illustrates a schematic diagram of another exemplary display device consistent with disclosed embodiments of the present disclosure.

FIG. 32 illustrates a schematic diagram of another display device consistent with disclosed embodiments of the present disclosure; and FIG. 33 illustrates a schematic diagram of another display device consistent with disclosed embodiments of the present disclosure. In certain embodiments, referring to FIG. 32 and FIG. 33, the curved mirror 30 may be connected with a sixth motor 606, and the sixth motor 606 may control the curved mirror 30 to rotate. Referring to FIG. 32, the curved mirror 30 may be connected with the sixth motor 606, and the sixth motor 606 may control the curved mirror 30 to rotate, where the rotation direction may be shown as an arrow J in FIG. 32. Therefore, through the control of the sixth motor 606, the curved mirror 30 may be rotated to change the paths of the light N1 (which may refer to the light emitted from the first light-exiting surface E1) and the light N2 (which may refer to the light emitted from the second light-exiting surface E2 and reflected by the reflective component 20) that are projected to the curved mirror 30 and reflected by the curved mirror 30, thereby further controlling the imaging heights of the first virtual image M1 and the second virtual image M2.

Optionally, when the display device 000 in the present disclosure is applied to a vehicle head-up display, according to the height difference and sitting habits of the observer in the vehicle, under the control of the sixth motor 606, the curved mirror 30 may be rotated to allow the observer's eye to be level with the first virtual image M1 and the second virtual image M2 even when being at a different position, which may improve the use experience satisfaction.

Referring to FIG. 33, after the curved mirror 30 is rotated under the control of the sixth motor 606, the curved mirror 30 may be located at a position shown in FIG. 33. The dotted line in FIG. 33 may indicate the position of the curved mirror 30 before being rotated and the original optical path direction. In view of this, after the curved mirror 30 is rotated, due to change of the position and angle of the curved mirror 30, the light N1 and the light N2 may be projected to the curved mirror 30 at a first position A1" and a second position A2", and the first position A1" and the second position A2" may be different from the first position A1 and the second position A2. Therefore, the height of the first virtual image M1 formed by the light N1 reflected by the curved mirror 30 and the height of the second virtual image M2 formed by the light N2 reflected by the curved mirror 30 may change, thereby controlling the imaging heights of the first virtual image M1 and the second virtual image M2.

Figure 34:
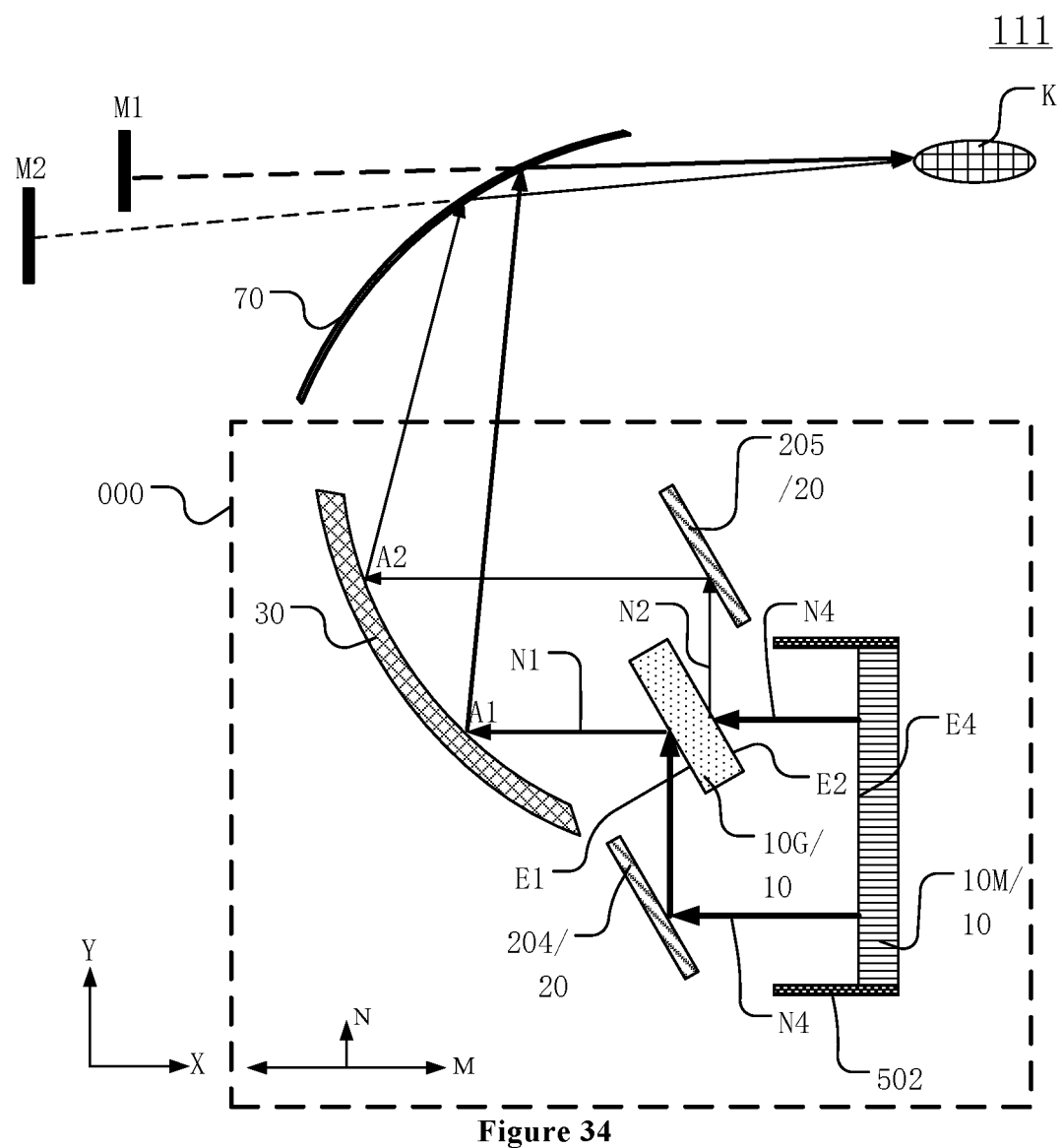
FIG. 34 illustrates a schematic diagram of an exemplary imaging system consistent with disclosed embodiments of the present disclosure.
Figure 35:
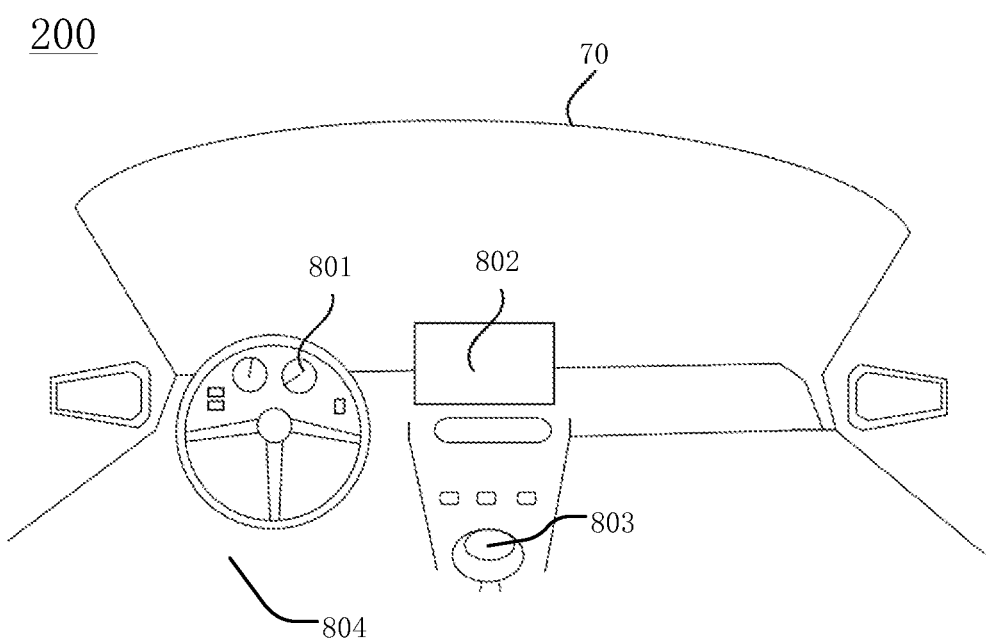
FIG. 35 illustrates a schematic diagram of an imaging system applied to an automobile consistent with disclosed embodiments of the present disclosure.

The present disclosure also provides an imaging system. FIG. 34 illustrates a schematic diagram of an imaging system consistent with disclosed embodiments of the present disclosure; and FIG. 35 illustrates a schematic diagram of an imaging system applied to an automobile consistent with disclosed embodiments of the present disclosure. In certain embodiments, referring to FIGS. 1-35, an imaging system 111 may include an imaging glass 70 and the display device 000 provided in any of the foregoing embodiments of the present disclosure. Optionally, the imaging system 111 may be applied to the field of vehicle display. The imaging glass 70 may be the front windshield glass of a car. For example, referring to FIG. 35, the car 200 may at least include a main driving position 804, a dashboard 801, and a front windshield. The dashboard 801 may be disposed between the main driving position 804 and the front windshield, the display device 000 may be disposed inside the dashboard 801, and the dashboard 801 may often be disposed below the front windshield.

In one embodiment, the car 200 may also include a center console 802 and a joystick 803. The center console 802 may be disposed between the front windshield and the joystick 803. The display device 000 may be disposed inside the center console 802. In other words, the display device 000 may be either a display device located at the position of the dashboard 801, or a display device located at the position of the center console 802.

The imaging glass 70 may be configured to reflect the light reflected by the curved mirror 30 into the eyes of the observer in the driver seat or the passenger seat (observation point K). The first virtual image M1 and the second virtual image M2 formed by the backward extension of the light reflected by the imaging glass 70 (as shown in FIG. 34) may be seen at the observation point K. The imaging system 111 in the present disclosure may have the beneficial effects of the display device 000 provided in the present disclosure, which may refer to the specific description of the display device 000 in the foregoing embodiments and may not be repeated herein.

The display device and imaging system in the present disclosure may at least include following beneficial effects. In the present disclosure, the display device may include the double-sided display module. The double-sided display module may include a first light-exiting surface and a second light-exiting surface for displaying images on the first light-exiting surface and the second light-exiting surface, respectively. After the first light-exiting surface and the second light-exiting surface of the double-sided display module display images, because the curved mirror is located on the side of the first light-exiting surface in the first direction, at least the light emitted from the first light-exiting surface may be directly projected to the first position on the curved mirror along the first direction, and may form the first virtual image after being reflected by the curved mirror. The light emitted from the second light-exiting surface may be projected to the second position on the curved mirror after being reflected by the reflective component, and then may form the second virtual image after being reflected by the curved mirror.

The reflective component may include a plane mirror having a reflection function. Because the first position does not overlap the second position, in other words, the position where the light emitted from the first light-exiting surface is directly projected to the curved mirror is different from the position where the light emitted from the second light-exiting surface is projected to the curved mirror after being reflected by the reflective component, two virtual images with different distances may be formed. In other words, the first virtual image may be spaced apart from the second virtual image in the first direction.

The display device in the present disclosure may form two virtual images with different distances through the cooperation of optical paths of the reflective component, the curved mirror and the double-sided display module. The double-sided display module may directly provide an integrated double-image source, which may facilitate to reduce a volume of the entire display device, reduce the cost, and improve the imaging quality.

The description of the disclosed embodiments is provided to illustrate the present disclosure to those skilled in the art. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments illustrated herein but is to be accorded the widest scope consistent with the principles and novel features disclosed herein.

What is claimed is:

1. A display device, comprising:
a double-sided display module, a reflective component, and a curved mirror, wherein:
   the double-sided display module includes a first light-exiting surface and a second light-exiting surface,
   in a first direction, the curved mirror is disposed on a side of the first light-exiting surface, and light emitted from the first light-exiting surface is projected to a first position on the curved mirror,
   the reflective component at least reflects light emitted from the second light-exiting surface to a second position on the curved mirror, wherein the first position does not overlap the second position, and
   in a second direction, the curved mirror reflects the light emitted from the first light-exiting surface and the light emitted from the second light-exiting surface and reflected by the reflective component, to form a first virtual image and a second virtual image, wherein along the first direction, the first virtual image is spaced apart from the second virtual image, and the first direction intersects the second direction.

2. The display device according to claim 1, wherein:
the curved mirror is a concave mirror, and
along the first direction, the curved mirror is recessed in a direction away from the double-sided display module to form the concave mirror.

3. The display device according to claim 1, wherein:
the double-sided display module includes any one of a micro light-emitting diode double-sided display screen, a mini light-emitting diode double-sided display screen, an organic light-emitting diode double-sided display screen, and a quantum dot light-emitting diode double-sided display screen.

4. The display device according to claim 3, wherein:
along the first direction, the reflective component is disposed on a side of the double-sided display module away from the curved mirror, and the first direction is perpendicular to a plane of the first light-exiting surface;
the reflective component includes a first plane mirror and a second plane mirror, wherein the first plane mirror and the second plane mirror are connected to and intersect each other;
the light emitted from the first light-exiting surface of the double-sided display module is directly projected to the first position on the curved mirror along the first direction; and
the light emitted from the second light-exiting surface of the double-sided display module is sequentially reflected by the first plane mirror and the second plane mirror, and then is projected to the second position on the curved mirror, wherein:
   an intersection angle between the first plane mirror and the second plane mirror is in a range of approximately 45°-135°, and both a reflective surface of the first plane mirror and a reflective surface of the second plane mirror face towards the double-sided display module.

5. The display device according to claim 4, wherein:
the intersection angle between the first plane mirror and the second plane mirror is approximately 90°.

6. The display device according to claim 3, wherein:
along the second direction, first light-shielding plates are disposed on both sides of the double-sided display module, respectively; and along the first direction, a first light-shielding plate of the first light-shielding plates has a length of L1, and along the second direction, the double-sided display module has a length of L2, wherein L1=A×L2, and a value of A is in a range of approximately 5%-20%.

7. The display device according to claim 3, wherein:
the double-sided display module is connected with a first motor, wherein the first motor controls the double-sided display module to move along the first direction; and/or
the reflective component is connected with a second motor, wherein the second motor controls the reflective component to move along the first direction.

8. The display device according to claim 3, wherein:
the reflective component at least includes a third plane mirror, wherein a reflective surface of the third plane mirror faces towards the second light-exiting surface, and the first direction intersects the first light-exiting surface at an angle;
the light emitted from the first light-exiting surface of the double-sided display module is directly projected to the first position on the curved mirror along the first direction; and
the light emitted from the second light-exiting surface of the double-sided display module is projected to the second position on the curved mirror after being reflected by the third plane mirror.

9. The display device according to claim 1, wherein:
the double-sided display module includes a first liquid crystal display panel, a first backlight module, and a second liquid crystal display panel that are laminated to fit each other, wherein:
  the first backlight module is one of a direct back-lit module and an edge back-lit module, and
  the first liquid crystal display panel includes the first light-exiting surface, and the second liquid crystal display panel includes the second light-exiting surface.

10. The display device according to claim 1, wherein:
the double-sided display module includes a third liquid crystal display panel, a second backlight module, and a fourth liquid crystal display panel that are laminated to fit each other, wherein:
  the second backlight module includes a plurality of mini light-emitting diodes arranged in an array or a plurality of micro light-emitting diodes arranged in an array, and
  the third liquid crystal display panel includes the first light-exiting surface, and the fourth liquid crystal display panel includes the second light-exiting surface.

11. The display device according to claim 10, wherein:
the plurality of mini light-emitting diodes or the plurality of micro light-emitting diodes at least include three colors, and
each of the third liquid crystal display panel and the fourth liquid crystal display panel does not include a color resist layer.

12. The display device according to claim 1, wherein:
the double-sided display module includes a double-sided display panel and a third backlight module that are independent of each other, wherein along the first direction, the third backlight module is disposed on a side of the double-sided display panel away from the curved mirror; and
the double-sided display panel includes a first self-luminous light-emitting display panel and a first reflective liquid crystal display panel, wherein a light-exiting surface of the first self-luminous light-emitting display panel is the first light-exiting surface, and a light-exiting surface of the first reflective liquid crystal display panel is the second light-exiting surface.

13. The display device according to claim 12, wherein:
the third backlight module includes a plurality of mini light-emitting diodes arranged in an array or a plurality of micro light-emitting diodes arranged in an array; and
the plurality of mini light-emitting diodes or the plurality of micro light-emitting diodes include at least three colors, and the first reflective liquid crystal display panel does not include a color resist layer.

14. The display device according to claim 1, wherein:
the double-sided display module includes a double-sided reflective display panel and a fourth backlight module that are independent of each other, and along the first direction, the fourth backlight module is disposed on a side of the double-sided reflective display panel away from the curved mirror;
the double-sided reflective display panel includes a second reflective liquid crystal display panel and a third reflective liquid crystal display panel that are laminated to fit each other, wherein a light-exiting surface of the second reflective liquid crystal display panel is the first light-exiting surface, and a light-exiting surface of the third reflective liquid crystal display panel is the second light-exiting surface;
the reflective component includes a fourth plane mirror and a fifth plane mirror, wherein a reflective surface of the fourth plane mirror faces towards the first light-exiting surface, and a reflective surface of the fifth plane mirror faces towards the second light-exiting surface;
the first direction intersects the first light-exiting surface at an angle, and the first direction is perpendicular to a plane of a light-exiting surface of the fourth backlight module;
light emitted from the light-exiting surface of the fourth backlight module is projected to the second reflective liquid crystal display panel after being reflected by the fourth plane mirror, and then is projected to the first position on the curved mirror after being reflected by the second reflective liquid crystal display panel; and
the light emitted from the light-exiting surface of the fourth backlight module is projected to the third reflective liquid crystal display panel, and then is projected to the fifth plane mirror after being reflected by the third reflective liquid crystal display panel, and then is projected to the second position on the curved mirror after being reflected by the fifth plane mirror.

15. The display device according to claim 14, wherein:
the fifth plane mirror is connected with a third motor, and the third motor controls the fifth plane mirror to move along the first direction; or
at least one of the fourth plane mirror and the fifth plane mirror is connected with a fourth motor, and the fourth motor controls the at least one of the fourth plane mirror and the fifth plane mirror to rotate.

16. The display device according to claim 14, wherein:
along the second direction, second light-shielding plates are disposed on both sides of the fourth backlight module, respectively; and
along the first direction, a second light-shielding plate of the second light-shielding plates has a length of L3, and along the second direction, the fourth backlight module has a length of L4, wherein L3=B×L4, and a value of B is in a range of approximately 5%-20%.

17. The display device according to claim 14, wherein:
the fourth backlight module includes a collimation layer.

18. The display device according to claim 14, wherein:
the double-sided reflective display panel is connected with a fifth motor, and the fifth motor controls the double-sided reflective display panel to move along the first direction.

19. The display device according to claim 1, wherein:
the curved mirror is connected with a sixth motor, and the sixth motor controls the curved mirror to rotate.

20. An imaging system, comprising:
an imaging glass and a display device, wherein:
the display device includes a double-sided display module, a reflective component, and a curved mirror, wherein:
  the double-sided display module includes a first light-exiting surface and a second light-exiting surface,
  in a first direction, the curved mirror is disposed on a side of the first light-exiting surface, and light emitted from the first light-exiting surface is projected to a first position on the curved mirror,
  the reflective component at least reflects light emitted from the second light-exiting surface to a second position on the curved mirror, wherein the first position does not overlap the second position, and
  in a second direction, the curved mirror reflects the light emitted from the first light-exiting surface and the light emitted from the second light-exiting surface and reflected by the reflective component, to form a first virtual image and a second virtual image, wherein along the first direction, the first virtual image is spaced apart from the second virtual image, and the first direction intersects the second direction, and
the imaging glass is configured to reflect the first virtual image and the second virtual image.

\* \* \* \* \*